United States Patent
Jun et al.

(10) Patent No.: US 7,483,105 B2
(45) Date of Patent: Jan. 27, 2009

(54) VERTICALLY ALIGNED MODE LIQUID CRYSTAL DISPLAY

(75) Inventors: Sahng-Ik Jun, Seoul (KR); Woon-Yong Park, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 482 days.

(21) Appl. No.: 10/488,048

(22) PCT Filed: Jun. 21, 2002

(86) PCT No.: PCT/KR02/01187

§ 371 (c)(1),
(2), (4) Date: Feb. 7, 2005

(87) PCT Pub. No.: WO03/096113

PCT Pub. Date: Nov. 20, 2003

(65) Prior Publication Data

US 2005/0231671 A1  Oct. 20, 2005

(30) Foreign Application Priority Data

May 9, 2002  (KR) ................................ 2002-25535

(51) Int. Cl.
  *G02F 1/1343* (2006.01)
(52) U.S. Cl. .................... 349/139; 349/38; 349/129
(58) Field of Classification Search ................ 349/139, 349/38, 129, 123, 144, 43, 141
  See application file for complete search history.

(56) References Cited

U.S. PATENT DOCUMENTS

| | | | | |
|---|---|---|---|---|
| 6,646,707 B2 * | 11/2003 | Noh et al. | .................... | 349/141 |
| 6,671,020 B2 * | 12/2003 | Kim et al. | .................... | 349/129 |
| 6,809,789 B2 * | 10/2004 | Kim et al. | .................... | 349/139 |
| 6,912,035 B2 * | 6/2005 | Kaneko et al. | .............. | 349/147 |

FOREIGN PATENT DOCUMENTS

| | | |
|---|---|---|
| JP | 11-258606 | 9/1999 |
| JP | 2000-137227 | 5/2000 |
| JP | 2001-235751 | 8/2001 |
| KR | 2000-0055524 | 9/2000 |
| KR | 2000-0056253 | 9/2000 |
| KR | 2000-0056511 | 9/2000 |
| KR | 2001-0007523 | 1/2001 |
| KR | 10 2001 0039261 | 5/2001 |
| KR | 1020010048491 | 6/2001 |
| KR | 10/20020017320 | 3/2002 |
| KR | 2002-0028477 | 4/2002 |
| KR | 10-0345961 | 7/2002 |

* cited by examiner

*Primary Examiner*—Thoi V Duong
(74) *Attorney, Agent, or Firm*—MacPherson Kwok Chen & Heid LLP

(57) ABSTRACT

A plurality of gate lines and a plurality of data lines intersecting each other are formed on a first insulating substrate having a plurality of first cutouts are formed on the respective pixel areas defined by the data lines and the gate lines. A thin film transistor is connected to each pixel electrode. A reference electrode having a plurality of second cutouts is formed on a second substrate opposite the first substrate. The first cutouts and the second cutouts in the adjacent two pixel areas opposite each other with respect to one data line have an inversion symmetry with respect to the data line.

7 Claims, 34 Drawing Sheets

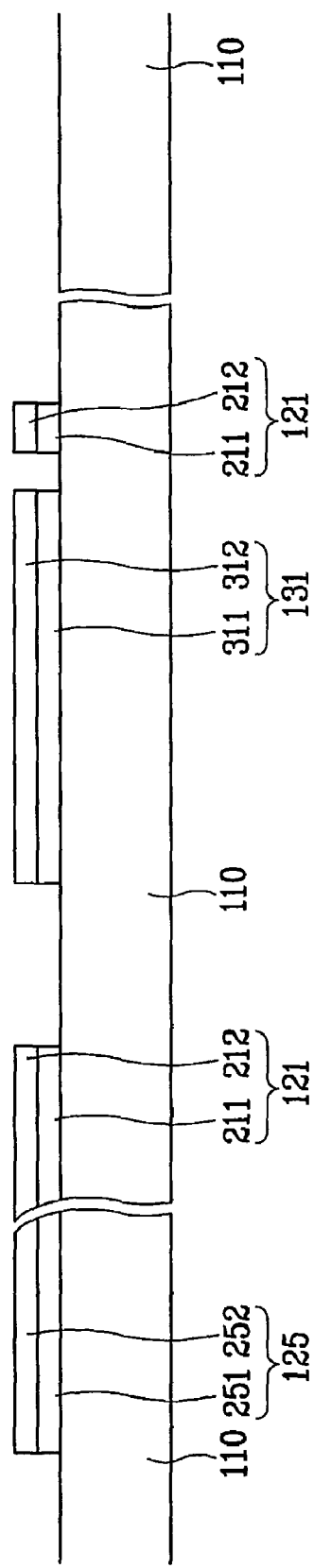

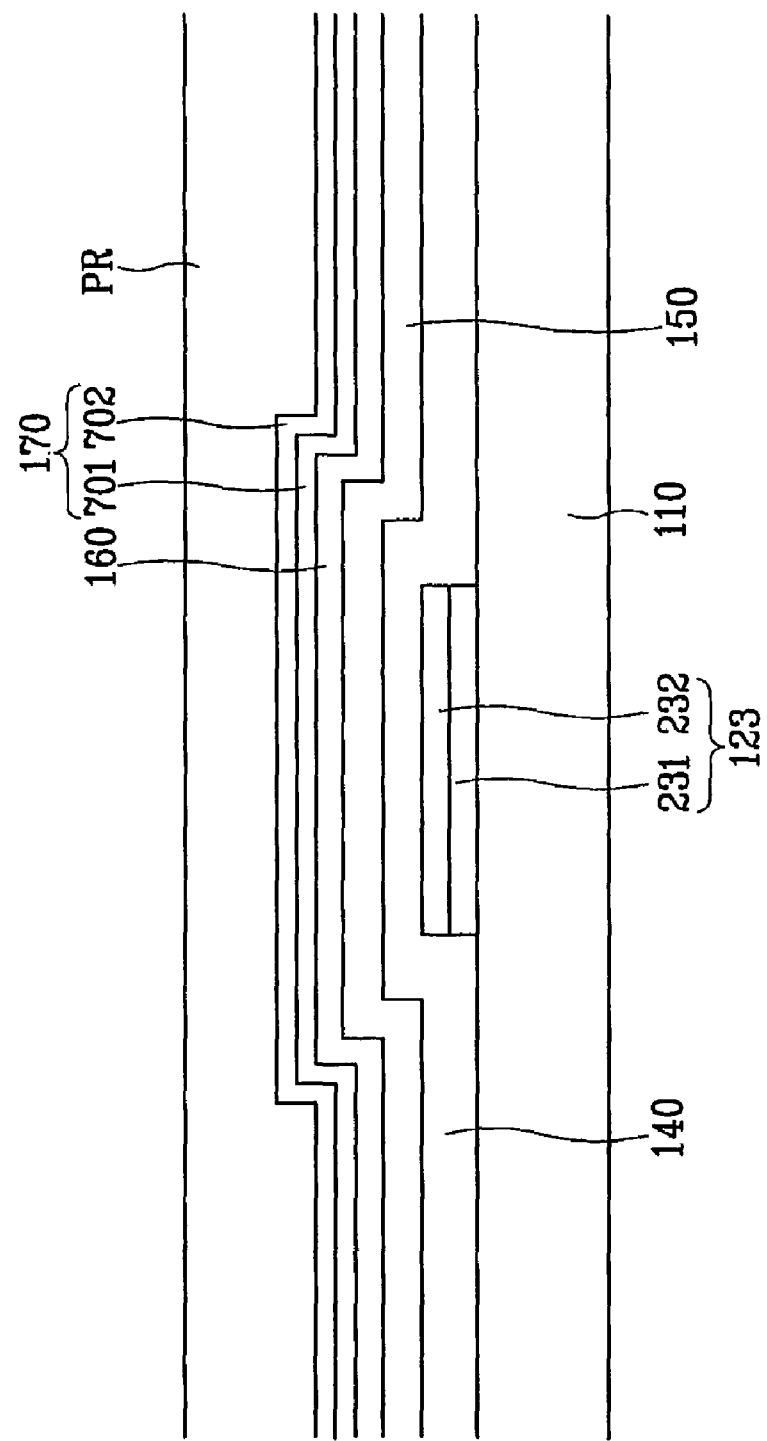

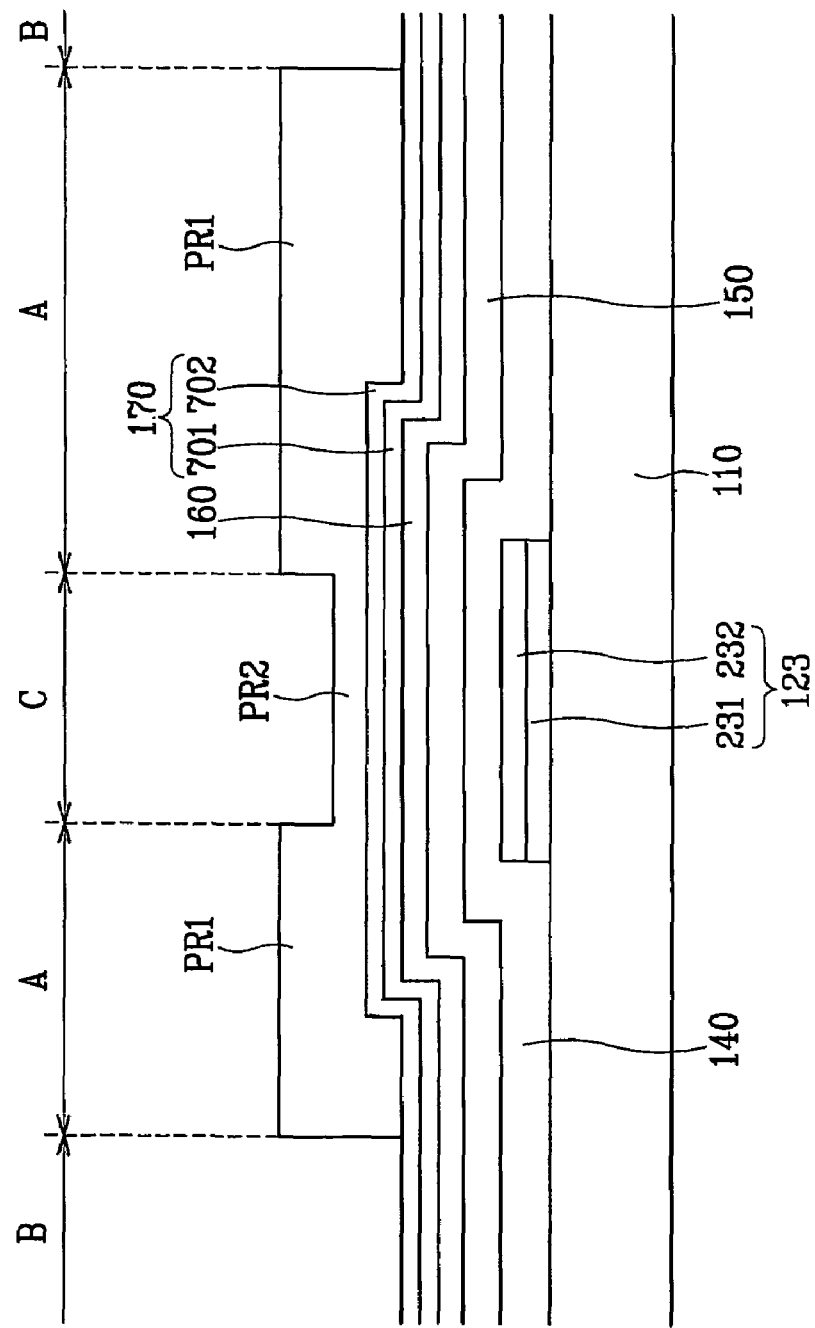

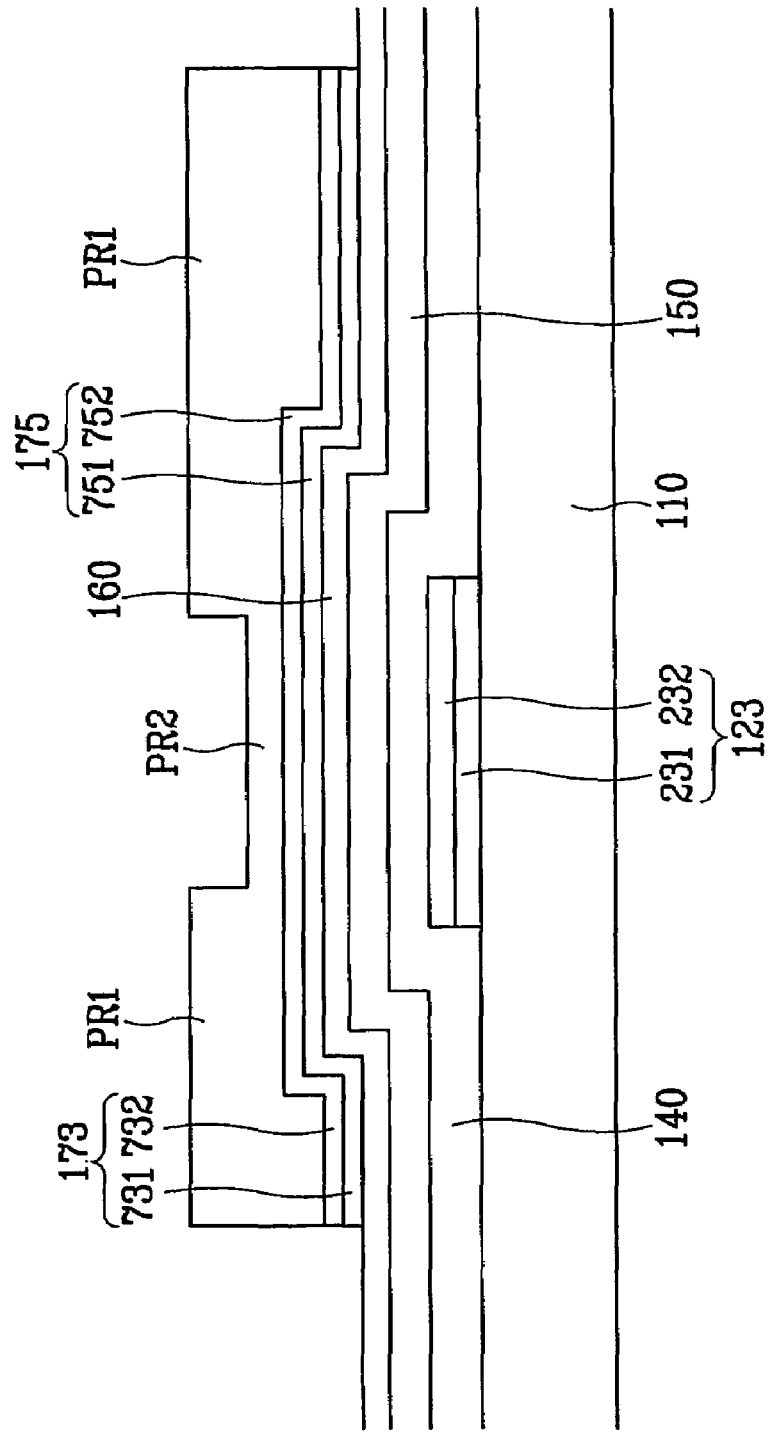

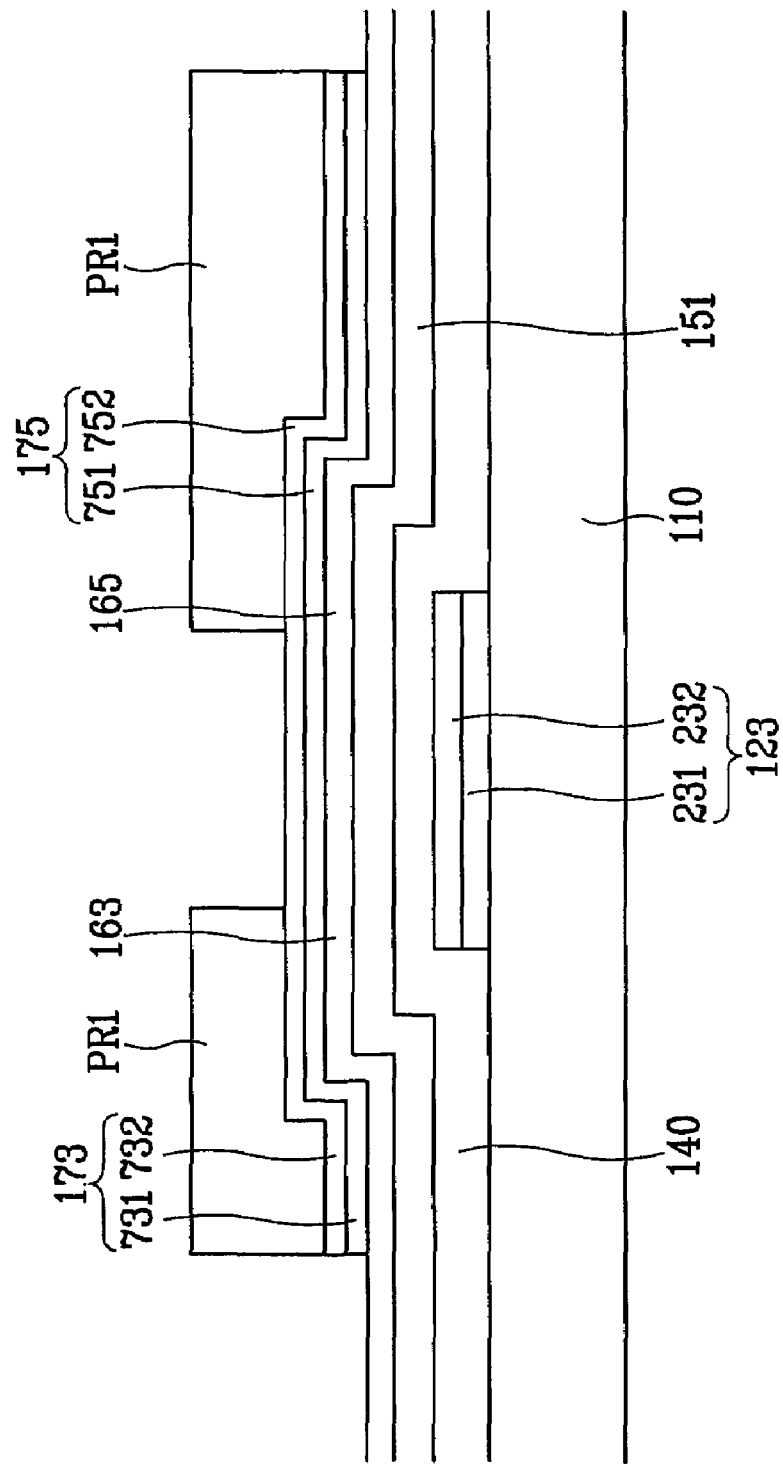

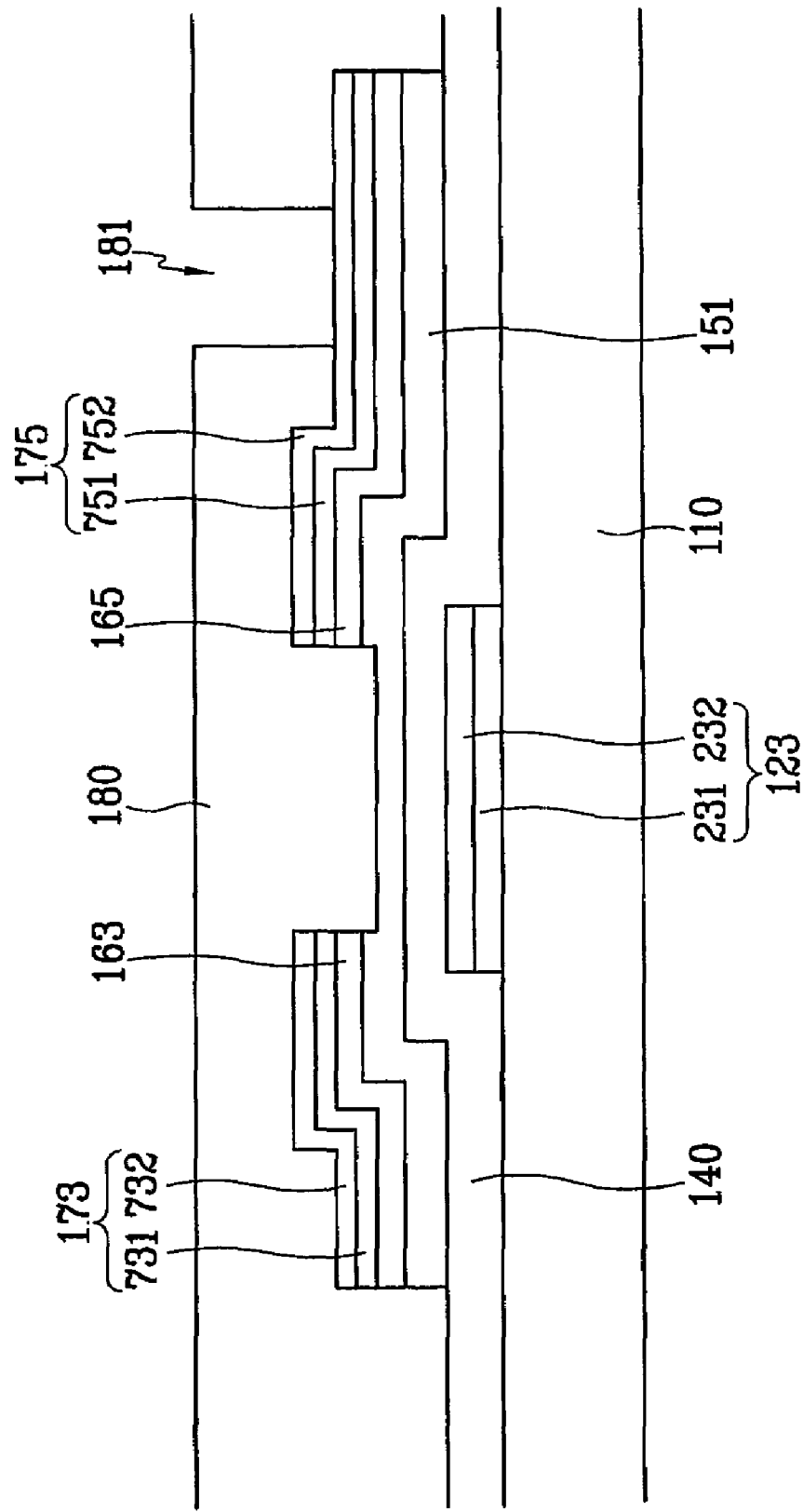

VERTICALLY ALIGNED MODE LIQUID CRYSTAL DISPLAY

BACKGROUND OF THE INVENTION (a) Field of the Invention

The present invention relates to a vertically aligned mode liquid crystal display, and, in particular, to a vertically aligned mode liquid crystal display including an electrode with cutouts for securing wide viewing angle.

(b) Description of Related Art

A typical liquid crystal display ("LCD") includes an upper panel with a reference electrode and color filters, a lower panel with thin film transistors ("TFTs") and pixel electrodes and a liquid crystal layer with dielectric anisotropy interposed therebetween, and displays desired images by applying different voltages to the reference electrode and the pixel electrodes to generate electric field in the liquid crystal layer, which changes the orientations of liquid crystal molecules to control the light transmittance.

Among these LCDs, a vertically aligned mode LCD (referred to as a "VALCD" hereinafter), which aligns the major axes of the liquid crystal molecules vertical to upper and lower panels in absence of electric field, is promising because of its high contrast ratio and wide viewing angle.

To implement wide viewing angle in the VALCD, a cutout pattern or protuberances are provided on the electrode. Both generate fringe field to regularly distribute tilt directions of the liquid crystal molecules into four directions, thereby giving wide viewing angle.

Meanwhile, a plurality of signal wires such as gate lines transmitting scanning signals and data lines transmitting image signals are provided on a panel with the TFTs (referred to as a "TFT array panel" hereinafter) for an LCD. These signal wires have their own resistances and are coupled with peripheral signal wires or the reference electrode of the upper panel to generate coupling capacitances. The loads due to such a resistances and capacitances of respective wires generate the distortion of the signals transmitted via the signal wires such as RC delay. In particular, the capacitive coupling between the data lines and the reference electrode drives the liquid crystal molecules disposed therebetween to cause light leakage near the data line, thereby deteriorating the image quality, and the light leakage, in turn, forces to enlarge the black matrix to reduce the aperture ratio.

SUMMARY OF THE INVENTION

An object of the present invention is to improve image quality by reducing the load of a data wire.

Another object of the present invention is to reduce the light leakage near a data line by decreasing coupling capacitance between the data line and a reference electrode.

To accomplish these and other objects, the present invention arranges cutouts located opposite each other with respect to a data line have inversion symmetry.

In detail, a thin film transistor array panel for liquid crystal display is provided, which includes: an insulating substrate; a gate line formed on the insulating substrate; a gate insulating layer formed on the gate lines; a data line formed on the gate insulating layer; a passivation layer formed on the data line; and a plurality of pixel electrodes formed on the passivation layer and having a plurality of cutouts, wherein the cutouts of two adjacent pixel electrodes opposite each other with respect to the data line have an inversion symmetry.

The cutouts of each pixel electrode preferably includes a transverse cutout extending substantially in a transverse direction to partition the pixel electrode into upper and lower halves and two oblique cutouts extending in oblique directions and located in the upper and the lower halves of the pixel electrode, and the oblique cutouts are substantially perpendicular to each other. In addition, the TFT array panel may further include a plurality of storage electrode wires including a storage electrode line parallel to the gate line and a storage electrode connected to the storage electrode line, and may further include a storage bridge connecting two adjacent storage electrode wires opposite each other with respect to the gate line.

A liquid crystal display is provided, which includes: a first insulating substrate; a plurality of first wires formed on the first insulating substrate; a plurality of second wires intersecting and insulated from the first wire; a plurality of pixel electrodes located on respective pixel areas defined by the first wires and the second wires; a plurality of thin film transistors, each having a gate electrode, a source electrode and a drain electrode respectively connected to one of the first wires, one of the second wires and one of the pixel electrodes; a second insulating substrate opposite the first insulating substrate; a reference electrode formed on the second insulating substrate; a plurality of first domain partitioning member formed on one of the first insulating substrate and the second insulating substrate; and a plurality of second domain partitioning member formed on one of the first insulating substrate or the second insulating substrate, wherein the first and the second domain partitioning members of two adjacent pixel electrodes opposite each other with respect to one of the data lines have an inversion symmetry.

The first domain partitioning members of the pixel electrodes preferably includes a plurality of cutouts, the plurality of cutouts of one of the pixel electrodes include a transverse cutout extending substantially in a transverse direction to partition the pixel electrode into upper and lower halves and two oblique cutouts extending in oblique directions and located in the upper and the lower halves of the pixel electrode, and the oblique cutouts are substantially perpendicular to each other. It is preferable that the oblique cutouts are interposed between the second domain partitioning members of the reference electrode, and each second domain partitioning member includes an oblique portion parallel to the oblique cutouts and an overlapping portion overlapping edges of the pixel electrodes. The first domain partitioning members of each pixel electrode preferably include a central cutout extending substantially along a transverse center line of the pixel electrode and forking into upper and lower branches diverging obliquely and two oblique cutouts extending in oblique directions and located respectively in a lower half and an upper half of the pixel electrode, and one of the second domain partitioning members of the reference electrode is interposed between the oblique cutouts of the first domain partitioning members and includes an oblique portion parallel to the oblique cutouts and an overlapping portion overlapping edges of at least one of the pixel electrodes and one of the data lines. The overlapping portion preferably overlaps the one of the data lines and adjacent two of the pixel electrodes opposite each other with respect to one of the data lines.

A method of manufacturing such a thin film transistor panel includes: forming a gate wire including a plurality of gate lines, a plurality of gate electrodes connected to the gate lines and a plurality of gate pads connected to the gate lines on an insulating substrate; forming a gate insulating layer; forming a semiconductor layer; forming a data wire including a plurality of data line intersecting the gate lines, a plurality of data pads connected to the data lines, a plurality of source electrodes adjacent to the gate electrodes and a plurality of drain electrodes disposed opposite the source electrodes by depositing and pattering a conductive material; forming a passivation layer; forming a plurality of contact holes exposing the gate pads, the data pads and the drain electrodes by patterning the passivation layer together with the gate insulating layer; and forming a plurality of auxiliary gate pads, a plurality of auxiliary data pads and a plurality of pixel electrodes respectively connected to the gate pads, the data pads and the drain electrodes via the contact holes by depositing and patterning a transparent conductive layer, wherein the formation of a plurality of pixel electrodes makes adjacent two of the pixel electrodes opposite each other with respect to one of the data lines to have a substantial inversion symmetry.

It is preferable that the data wire and the semiconductor layer are formed together by one photolithography using a photoresist pattern having a first portion, a second portion thinner than the first portion, and a third portion thinner than the second portion. The second portion is preferably located between one of the source electrodes and one of the drain electrodes and the first portion is located on the data wire in the one photolithography.

BRIEF DESCRIPTION OF THE DRAWINGS

FIGS. 18A and 18B to FIGS. 26A and 26B are sectional views of a TFT array panel for an LCD sequentially showing the steps of a manufacturing method thereof using four masks.

DETAILED DESCRIPTION OF PREFERRED EMBODIMENTS

Figure 1:
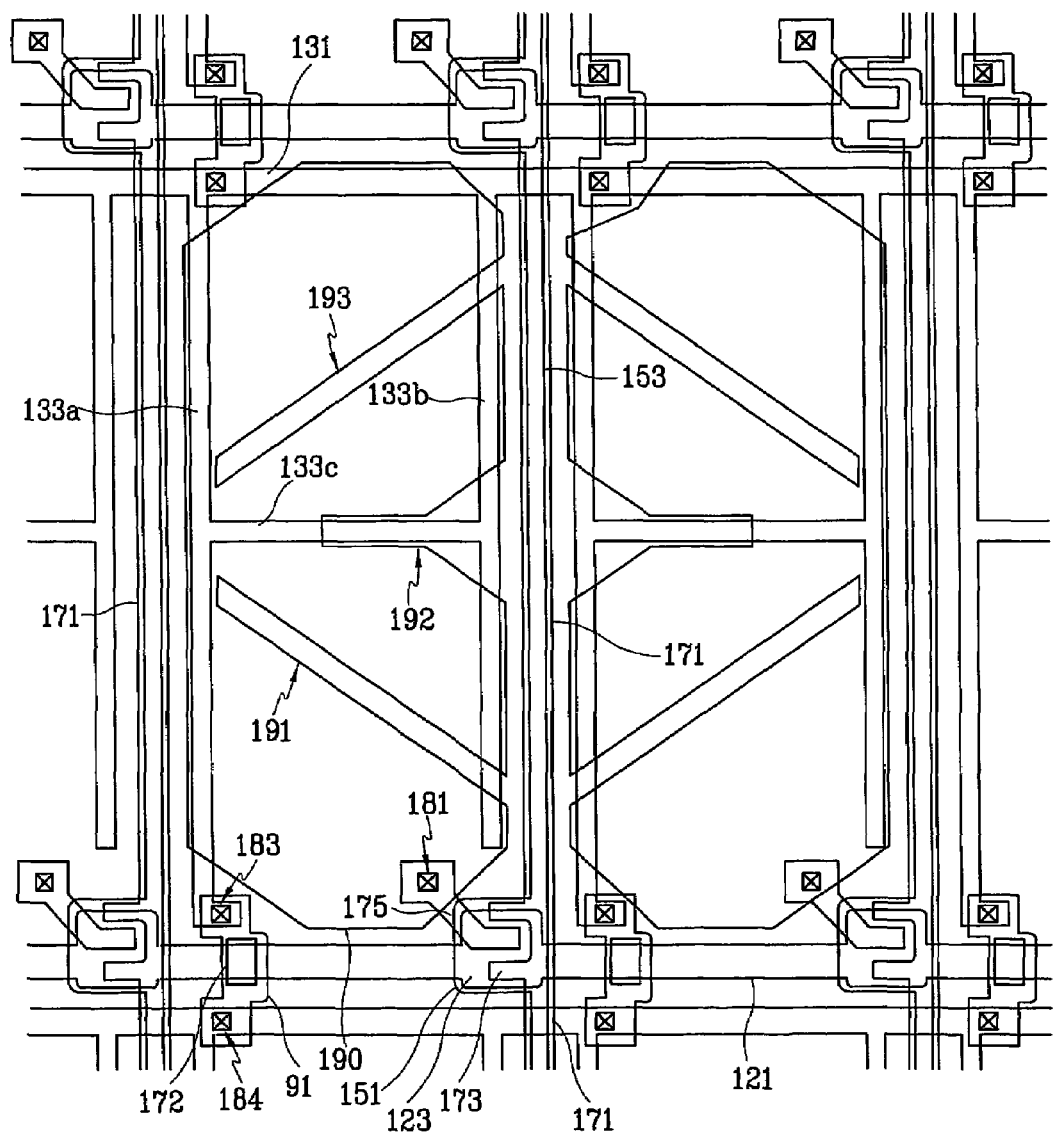
FIG. 1 is a layout view of a TFT array panel for an LCD according to a first embodiment of the present invention.

Embodiments of the present invention will be described in detail with reference to accompanying drawings for those skilled in the art to practice easily. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Then, thin film transistor array panels for liquid crystal displays according to embodiments of the present invention will be described with reference to the drawings.

Figure 2:
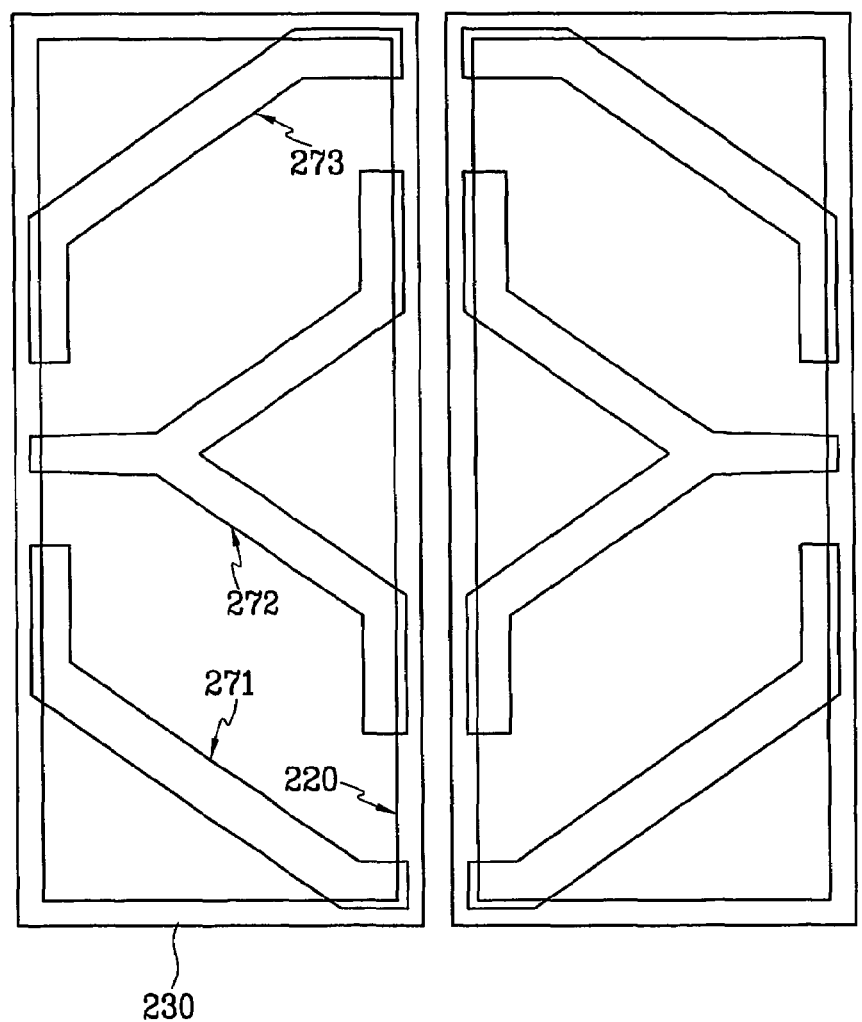
FIG. 2 is a layout view of a color filter panel for an LCD according to the first embodiment of the present invention.
Figure 3:
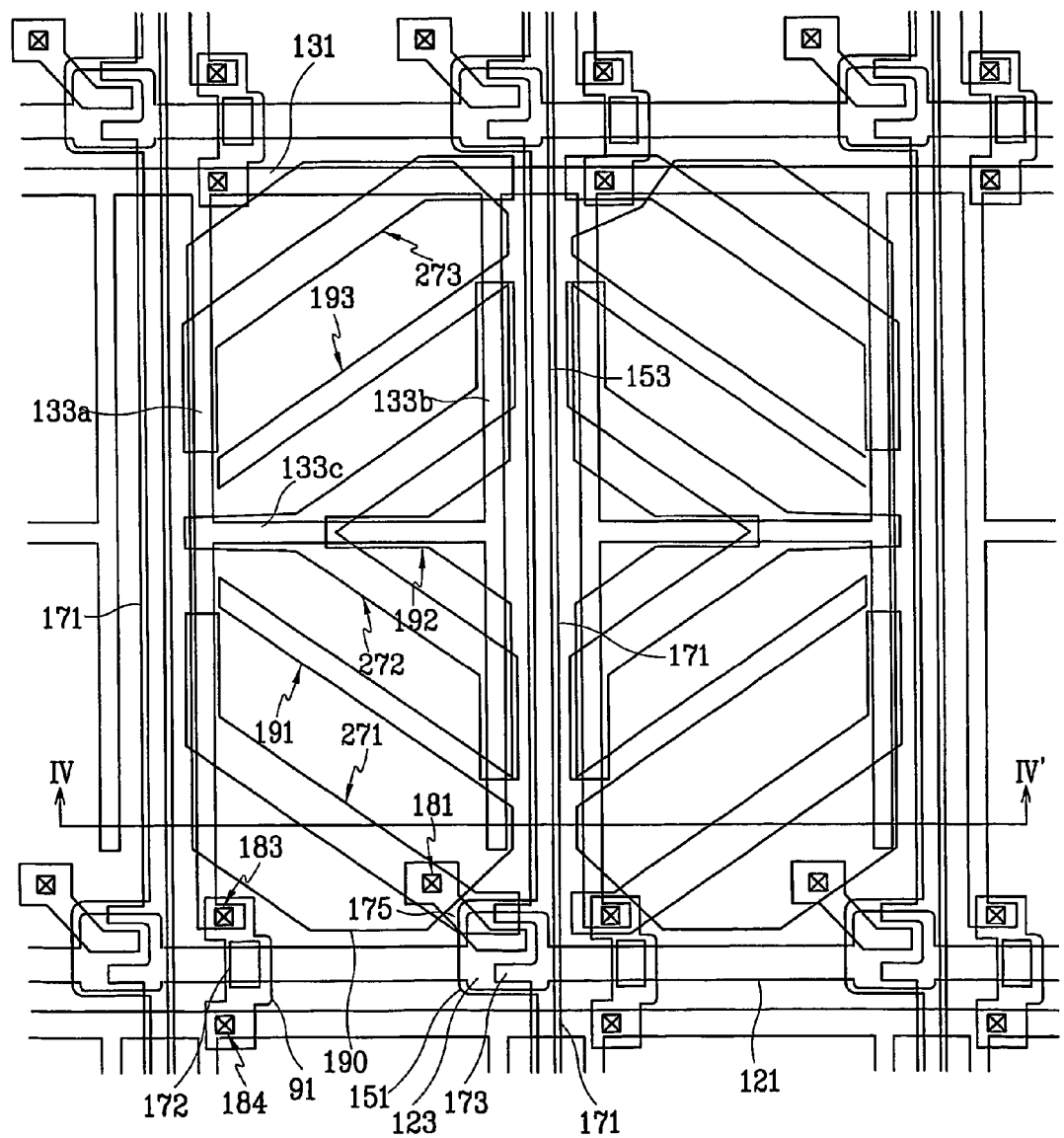
FIG. 3 is a layout view of an LCD according to the first embodiment of the present invention.
Figure 4:
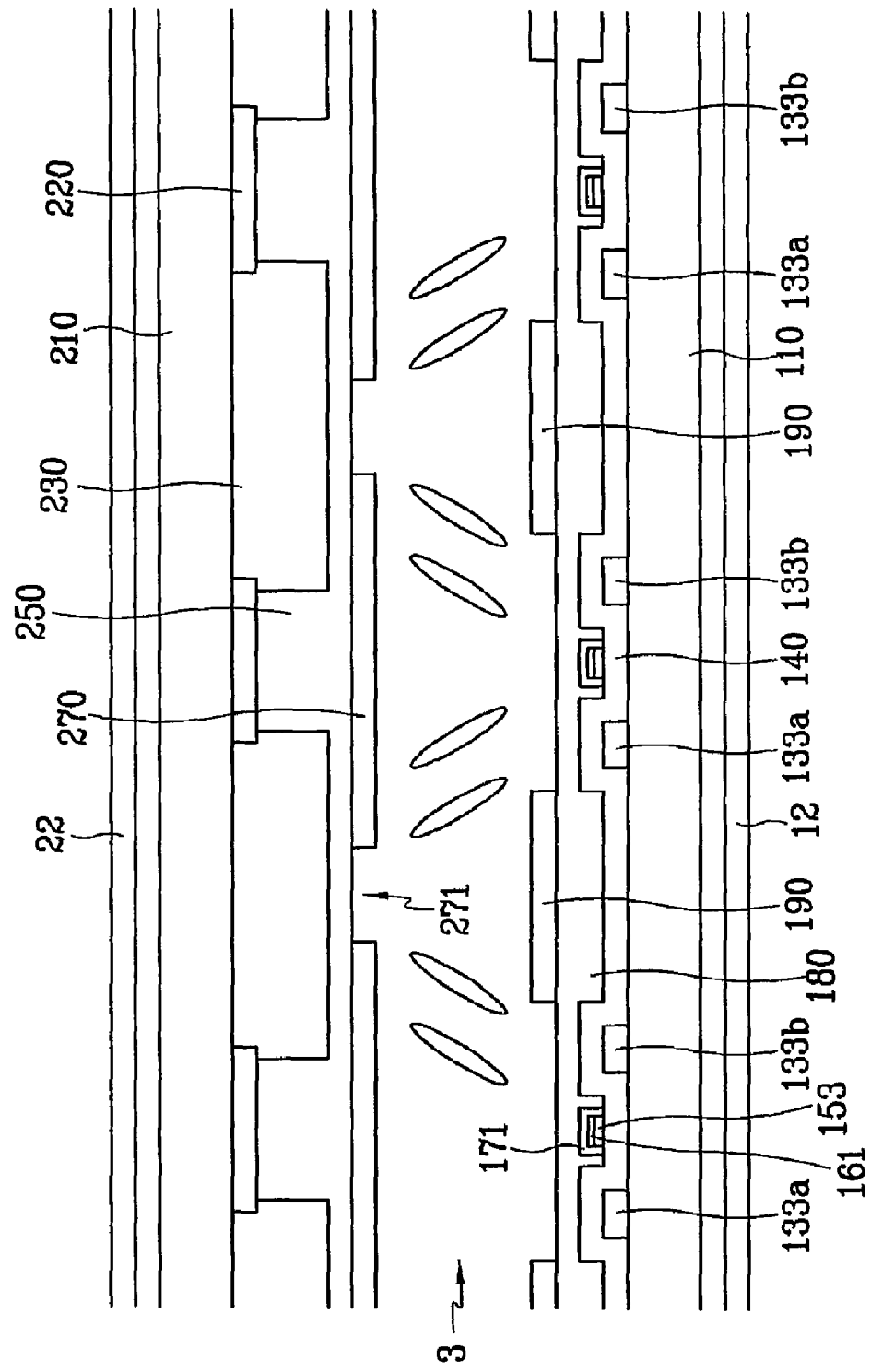
FIG. 4 is a sectional view taken along the line IV-IV' in FIG. 3.

FIG. 1 is a layout view of a TFT array panel for an LCD according to a first embodiment of the present invention, FIG. 2 is a layout view of a color filter panel for an LCD according to the first embodiment of the present invention, FIG. 3 is a layout view of an LCD according to the first embodiment of the present invention, and FIG. 4 is a sectional view taken along the line IV-IV' in FIG. 3.

An LCD includes a lower substrate 110, an upper substrate 210 opposite thereto and a liquid crystal layer 3 interposed between the substrates 110 and 210 and including liquid crystal molecules aligned vertical to the substrates 110 and 210.

A plurality of pixel electrodes 190 are formed on an inner surface of the lower substrate 110 preferably made of transparent insulating material such as glass. The pixel electrodes 190 are preferably made of transparent conductive material such as ITO (indium tin oxide) and IZO (indium zinc oxide) and have a plurality of cutouts 191, 192 and 193. The respective pixel electrodes 190 are connected to TFTs to be applied with image signal voltages. The TFTs are connected to a plurality of gate lines 121 transmitting scanning signals and a plurality of data lines 171 transmitting image signals, to be turned on or off in response to the scanning signals. A lower polarizer 12 is attached on an outer surface of the lower substrate 110. For a reflective LCD, the pixel electrodes 190 are not made of transparent material, and the lower polarizer 12 is unnecessary.

A black matrix 220 for blocking light leakage, a plurality of the red, green and blue color filters 230 and a reference electrode 270 preferably made of transparent conductive material such as ITO and IZO are formed on an inner surface of the upper substrate 210 preferably made of transparent insulating material such as glass. A plurality of cutouts 271, 272 and 273 are provided on the reference electrode 270. Although the black matrix 220 overlaps the boundaries of pixel areas, it may further overlap the cutouts 271, 272 and 273 of the reference electrode 270 in order for blocking light leakage generated by the cutouts 271, 272 and 273.

An LCD according to the first embodiment will be described more in detail.

A plurality of gate lines 121 extending substantially in a transverse direction are formed on a lower insulating substrate 110. A plurality of expansions of each gate line 121 form a plurality of gate electrodes 123. A plurality of storage electrode lines 131 extending substantially parallel to the gate lines 121 are also formed on the insulating substrate 110. A plurality of pairs of storage electrodes 133a and 133b extending in a longitudinal direction are branched from each storage electrode line 131 are connected to each other via a storage electrode 133c extending in the transverse direction. The number of the storage electrode lines 131 may be two or more. The gate lines 121, the gate electrodes 123, the storage electrode lines 131 and the storage electrodes 133 are preferably made of metal such as Al or Cr. They include either a single layer or double layers preferably including sequentially deposited Cr and Al layers. Alternatively, they include a variety of metals.

A gate insulating layer 140 preferably made of SiNx is formed on the gate lines 121, the storage electrode lines 131 and the storage electrodes 133.

A plurality of data lines 171 extending in the longitudinal direction are formed on the gate insulating layer 140. A plurality of branches of each data line 171 form a plurality of source electrodes 173 and a plurality of drain electrodes 175 are formed adjacent to the respective source electrodes 173. In addition, a plurality of under-bridge metal pieces 172 overlapping the gate lines 121 are formed on the gate insulating layer 140. The data lines 171, the source electrodes 173 and the drain electrodes 175 are preferably made of Cr or Al like the gate wire. They may also have a single-layered structure or a multiple-layered structure.

A plurality of channel portions 151 of a semiconductor layer 151 and 153 used as channel portions of TFTs are formed under the source electrodes 173 and the drain electrodes 175, and a plurality of data portions 153 of the semiconductor layer 151 and 153 extending in the longitudinal direction and connecting the semiconductor channel portions 153 are formed under the data lines 171. A contact layer 161 for reducing the contact resistance between the source and the drain electrodes 173 and 175 and the semiconductor channel portions 151 is formed on the semiconductor layer 151 and 153. The semiconductor layer 151 and 153 is preferably made of amorphous silicon, and the contact layer 161 is preferably made of amorphous silicon heavily doped with N-type impurity.

A passivation layer 180 preferably made of inorganic insulator such as SiNx or organic insulator such as resin is formed on the data lines 171 and the like. A plurality of contact holes 181 exposing the drain electrodes 175 are provided in the passivation layer 180.

A plurality of pixel electrodes 190, each having a plurality of cutouts 191, 192 and 193, are formed on the passivation layer 180. The pixel electrodes 190 are preferably made of a transparent conductor such as ITO or IZO or an opaque conductor having an excellent light-reflecting characteristic such as Al. The cutouts 191, 192 and 193 on each pixel electrode 190 include a transverse cutout 192 extending in the transverse direction and located at a position so as to partition the pixel electrode 190 into upper and lower halves arranged in the longitudinal direction, and two oblique cutouts 191 and 193 extending in oblique directions and located respectively in the lower and the upper halves of the pixel electrodes 190. The extensions of the oblique cutouts 191 and 193 are perpendicular to each other in order for regularly distributing the field directions of the fringe fields into four directions.

The cutouts 191, 192 and 193 of two adjacent pixel electrodes 190 opposite each other with respect to a data line 171 have substantially inversion symmetry with respect to the data line 171.

In addition, a plurality of storage connections or bridges 91, which connect the storage electrodes 133a to the storage electrode lines 131 opposite thereto with respect to the gate lines 121, are formed on the passivation layer 180. The storage bridges 91 contact the storage electrodes 133a and the storage electrode lines 131 via a plurality of contact holes 183 and 184 provided both in the passivation layer 180 and the gate insulating layer 140. The storage bridges 91 overlap the under-bridge metal pieces 172. The storage bridges 91 electrically connect all the storage wire on the lower substrate 110. This storage wire, if necessary, may be used for repairing the defects of the gate lines 121 and/or the data lines 171, and the under-bridge metal pieces 172 are used for enhancing electrical connections between the gate lines 121 and the storage bridges 91 when irradiating a laser beam for such repair.

A black matrix 220 for blocking light leakage is formed on an upper substrate 210. A plurality of red, green and blue color filters 230 are formed on the black matrix 220. A reference electrode 270 having a plurality of sets of cutouts 271, 272 and 273 are formed on the color filters 230. The reference electrode 270 is preferably made of a transparent conductor such as ITO or IZO.

Each set of the cutouts 271, 272 and 273 of the reference electrode 270 interpose the oblique cutouts 191 and 193 of the pixel electrode 190 between two adjacent cutouts 271, 272 and 273. Each cutout 271, 272 or 273 includes an oblique portion or portions parallel to the oblique cutouts 191 and 193 and transverse and longitudinal portions overlapping the edges of the pixel electrodes 190.

The cutouts 271, 272 and 273 of the reference electrode 270 opposite each other with respect to a boundary line between two adjacent pixel areas (i.e., a line extending along the data line) have substantially inversion symmetry with respect to the boundary line.

A basic structure of an LCD according to the present invention is prepared by aligning and combining the TFT array panel and the color filter panel having the above-described configurations and injecting liquid crystal material therebetween to be vertically aligned. When the TFT array panel and the color filter panel are aligned, the cutouts 191, 192 and 193 of the pixel electrodes 190 and the cutouts of the reference electrode 271, 272 and 273 divide the respective pixel areas into several small domains. These small domains are classified into four types based on average direction of major axes of liquid crystal molecules therein. The small domains of two adjacent pixel areas opposite each other with respect to a data line 171 have substantial inversion symmetry with respect to the data line 171 due to the inversion symmetry of both the cutouts 191, 192 and 193 of the pixel electrodes 190 and the cutouts 271, 272 and 273 of the reference electrode 270. In this case, the term substantial inversion symmetry" means that it allows the distortion of the symmetry due to the aligning error of the upper and lower substrates 110 and 210.

Figure 5A:
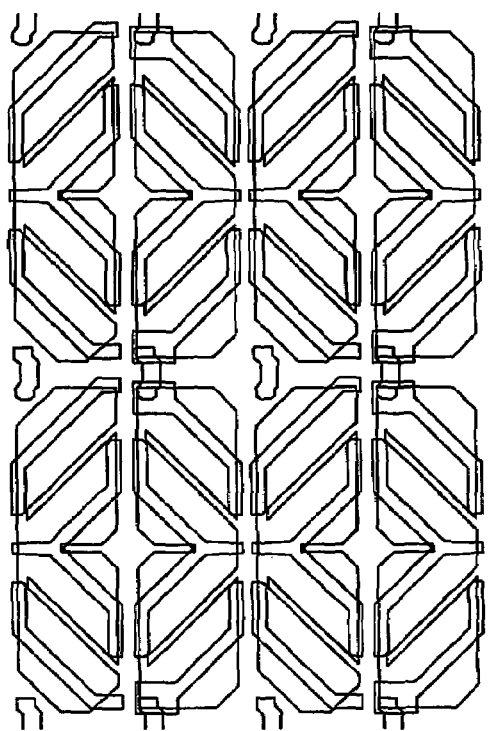
FIG. 5A is a layout view of pixel electrodes and cutouts of eight pixels (4×2) of an LCD according to the first embodiment of the present invention.
Figure 5B:
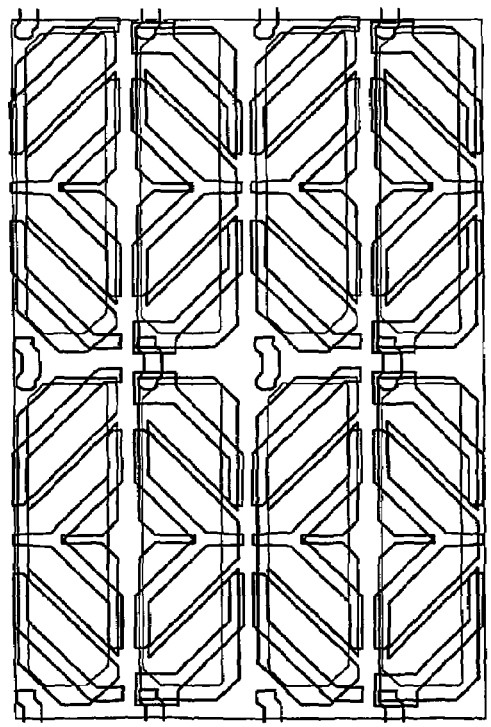
FIG. 5B is a layout view of those shown in FIG. 5A with a black matrix.

FIG. 5A is a layout view of pixel electrodes and cutouts of eight pixels (4×2) of an LCD according to the first embodiment of the present invention, and FIG. 5B is a layout view of those shown in FIG. 5A with a black matrix.

As shown in FIG. 5A, an LCD according to the first embodiment of the present invention has a cutout pattern including an octagon including the cutouts of a pair of adjacent pixels and repeatedly arranged in four directions.

Considering the arrangement of a black matrix, as shown in FIG. 5B, the transverse and longitudinal portions are blocked by the black matrix except for transverse portions located at the centers of the pixel areas. The aperture ratio of the LCD having this configuration reaches 41%.

Figure 6:
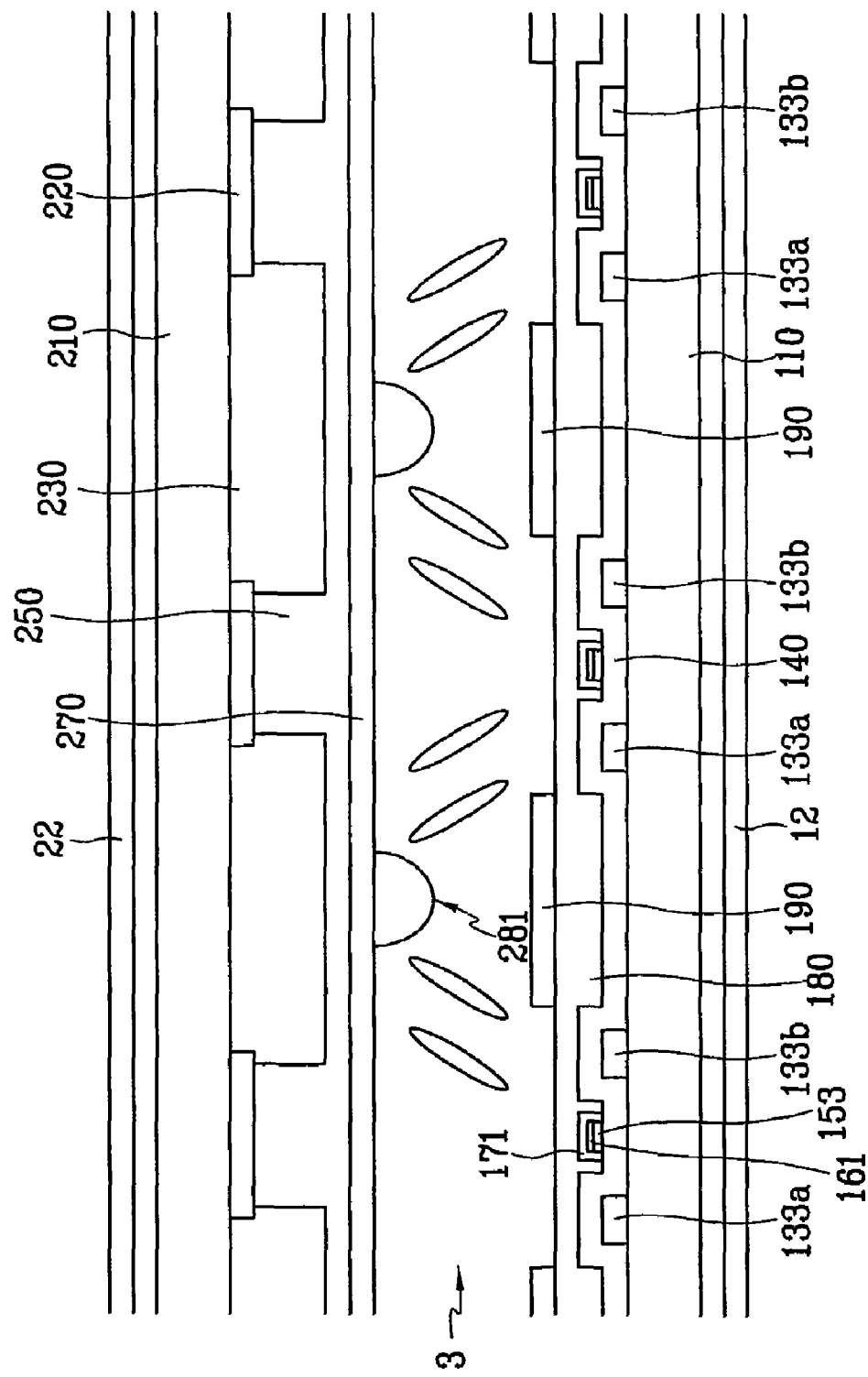
FIG. 6 is a sectional view of an LCD according to a second embodiment of the present invention.

FIG. 6 is a sectional view of an LCD according to a second embodiment of the present invention.

An LCD according to the second embodiment is different from the LCD according to the first embodiment in that a plurality of protuberances 281 are provided as a domain partitioning means instead of the cutouts of a reference electrode. Alternatively, a plurality of protuberances 281 is provided on a plurality of pixel electrodes 190, or the cutouts 191, 192 and 193 the pixel electrodes 190 are substituted with a plurality of protuberances.

Figure 7:
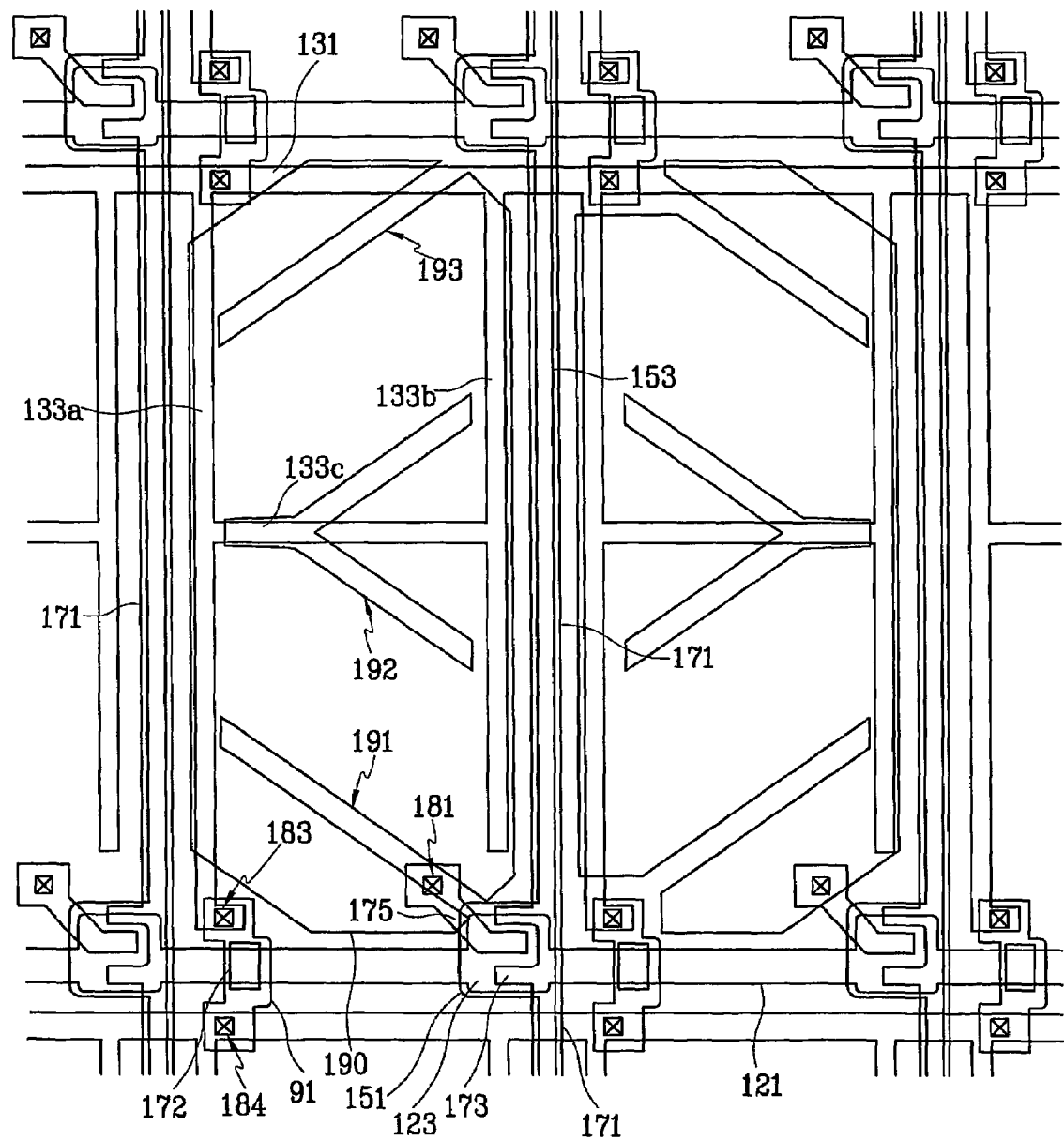
FIG. 7 is a layout view of a TFT array panel for an LCD according to a third embodiment of the present invention.
Figure 8:
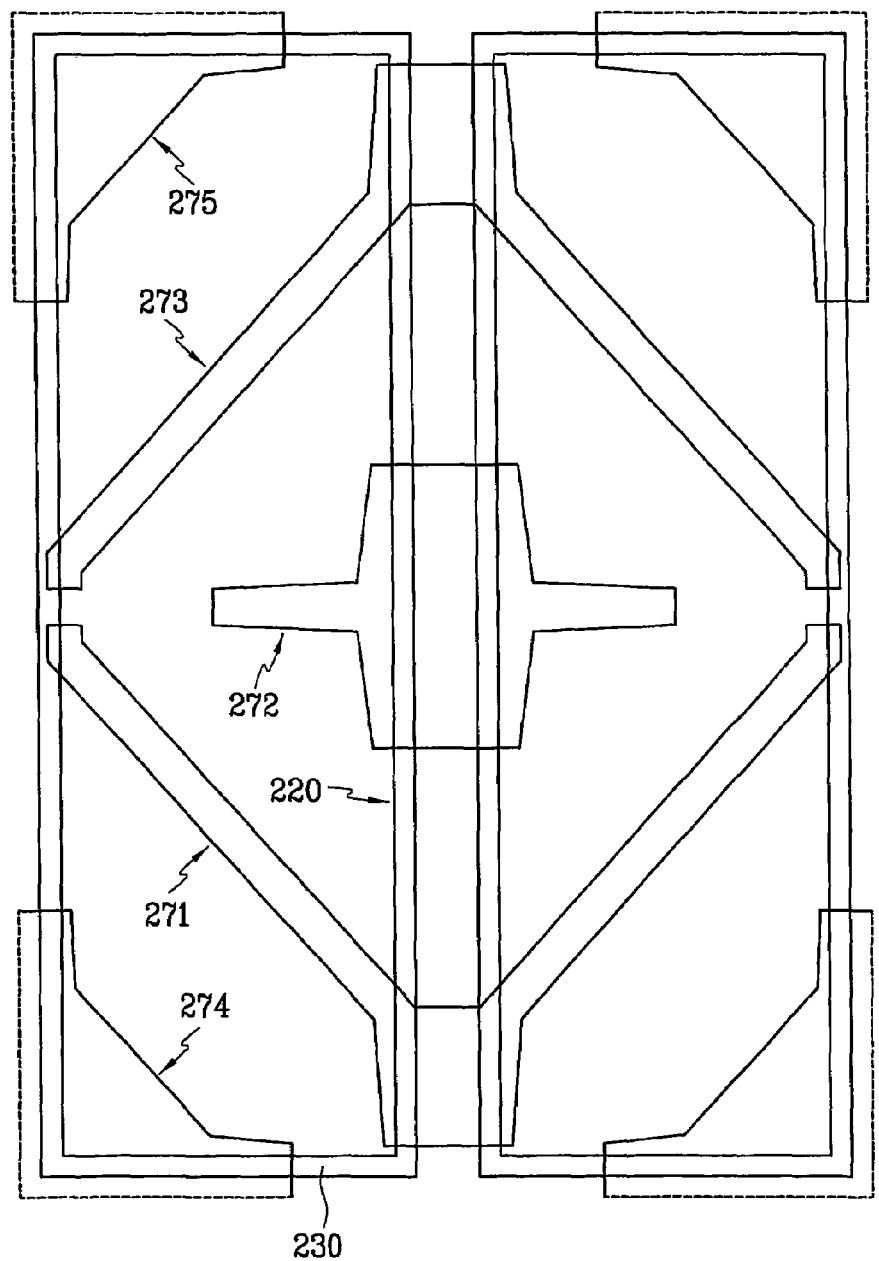
FIG. 8 is a layout view of a color filter panel according to the third embodiment of the present invention.
Figure 9:
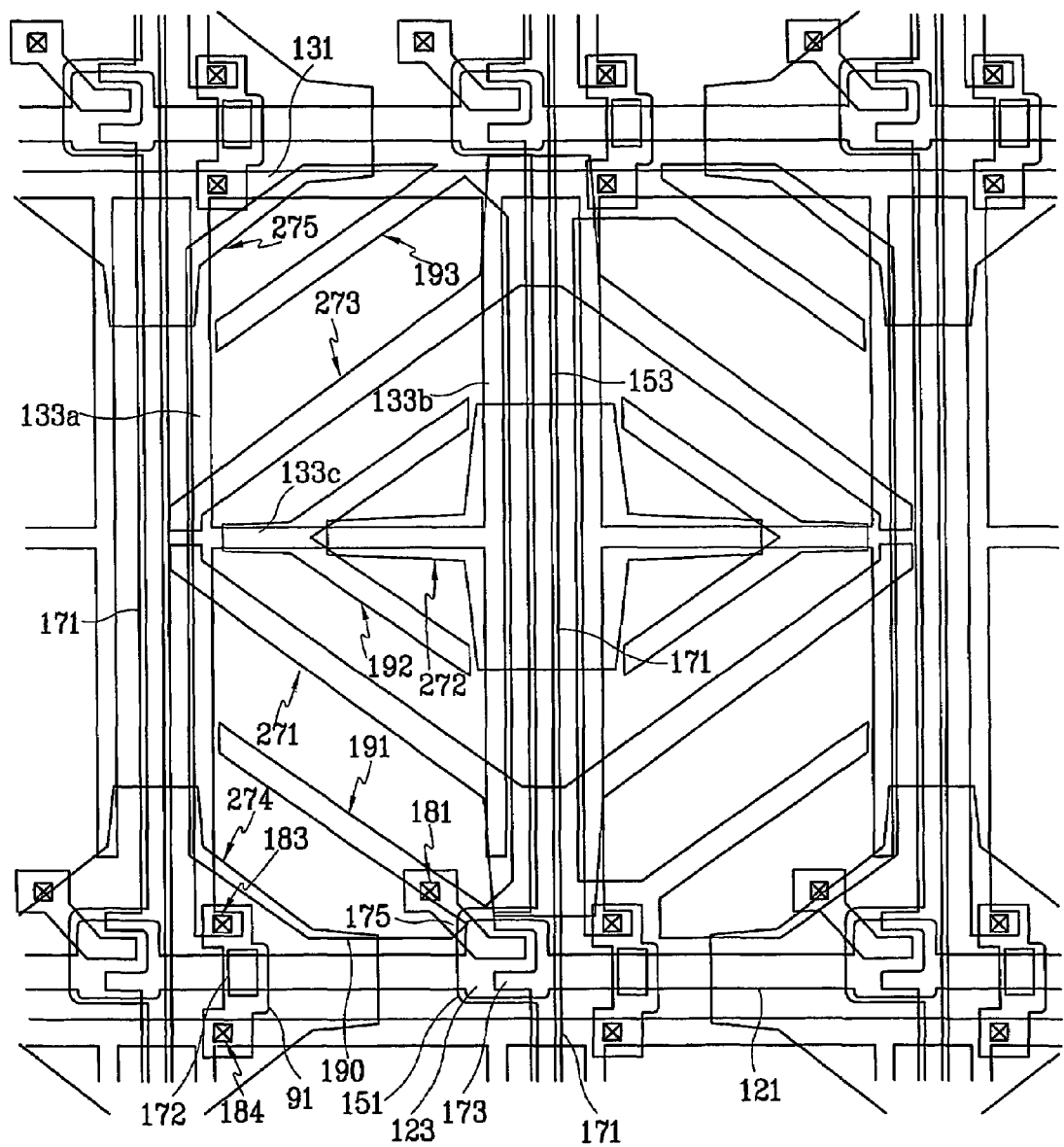
FIG. 9 is a layout view of an LCD according to the third embodiment of the present invention.

FIG. 7 is a layout view of a TFT array panel for an LCD according to a third embodiment of the present invention, and FIG. 8 is a layout view of a color filter panel according to the third embodiment of the present invention, and FIG. 9 is a layout view of an LCD according to the third embodiment of the present invention.

A TFT array panel of an LCD according to the third embodiment of the present invention has substantially the same structure as that according to the first embodiment shown in FIG. 1 except for the arrangements of cutouts of pixel electrodes. Only the arrangement of cutouts 191, 192 and 193 will be described now.

The cutouts 191, 192 and 193 of each pixel electrode 190 of the TFT array panel for an LCD according to the third embodiment include a central cutout 192 extending substantially along a transverse center line of the pixel electrode 190 and then forking into upper and lower branches diverging obliquely and two oblique cutouts 191 and 193 extending in oblique directions and located respectively in a lower half and an upper half of the pixel electrode 190.

A color filter panel has a black matrix 220 and a plurality of color filters 230, which have substantially the same configurations as that according to the first embodiment. However, the color filter array panel has a reference electrode with a plurality of first to five cutouts 271-275 having the shapes different from those according to the first embodiment. Only the arrangement of the cutouts 271-275 will be described now.

Each first cutout 271 and each third cutout 273 traverse a pixel area in oblique directions and the cutouts 271 and 273 in two adjacent pixel areas are connected to each other. Each connection of the cutouts occupies a considerable portion of the boundary areas between the two pixel areas. Each second cutout 272 traverses the pixel area, and the cutouts 272 in two neighboring pixel areas are connected to each other. Each connection of the cutouts occupies a considerable portion of the boundary areas between the two pixel areas. Each fourth cutout 274 and each fifth cutout 275 chamfer the corners of the pixel area to occupy considerable corner portions of the pixel area. The fourth and the fifth cutouts 274 and 275 in two adjacent pixel areas are connected to each other. In addition, the fourth and the fifth cutouts 274 and 275 in two adjacent pixel areas arranged in the longitudinal direction are connected to each other. As described above, although the portions connecting the cutouts between the neighboring pixel areas have been referred to as the connections, they are also referred to as the overlaps so as to underscore that the portions overlap the data lines. This reference is suggested in order to focus on a function that the overlapping of the cutouts and the data lines reduce the capacitive load applied to the data lines to reduce the distortion of the image signals.

The feature of the LCD according to the third embodiment is to large areas of the reference electrode near the boundaries of the pixel areas are removed due to connections of the cutouts 271-275 of the reference electrode 270 between the neighboring pixels. The removal of the reference electrode near the boundaries of the pixel areas reduces the capacitive load applied to the data lines 171 to decrease the distortion of the signals due to RC delay. This will be described more in detail later.

Figure 10A:
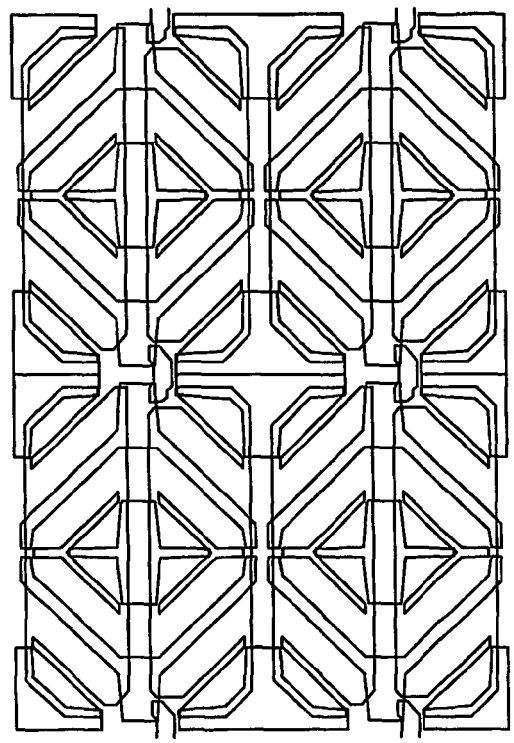
FIG. 10A is a layout view of pixel electrodes and cutouts of eight pixels (4×2) of an LCD according to the third embodiment of the present invention.
Figure 10B:
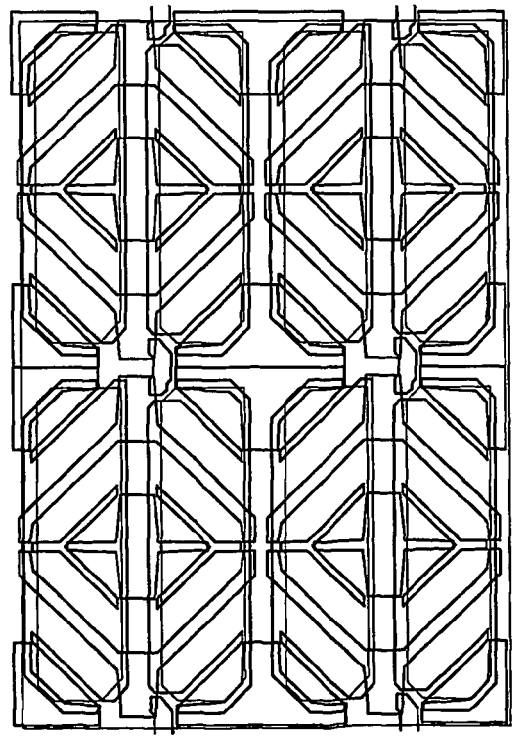
FIG. 10B is a layout view of those shown in FIG. 10A with a black matrix.

FIG. 10A is a layout view of pixel electrodes and cutouts of eight pixels (4×2) of an LCD according to the third embodiment of the present invention, and FIG. 10B is a layout view of those shown in FIG. 10A with a black matrix.

First, as shown in FIG. 10A, the LCD according to the third embodiment of the present invention has a cutout pattern including a diamond shape including the cutouts of a pair of adjacent pixels and repeatedly arranged in four directions. In addition, a cross-shaped pattern is arranged at the center of four diamond shapes.

Considering the arrangement of a black matrix, as shown in FIG. 10B, the transverse and longitudinal portions are blocked by the black matrix except for transverse portions located at the centers of the pixel areas.

Considering the arrangement of the black matrix, as shown in FIG. 10B, most of the connections of the first to the fifth cutouts positioned near the boundaries the pixel areas are blocked by the black matrix.

This arrangement can reduce the capacitive load applied to the data lines and increase the aperture ratio of the LCD. The aperture ratio reaches 42% in this arrangement.

Then, the reduction of the capacitive load applied to the data lines in the LCD according to the third embodiment will be examined more in detail.

Figure 11:
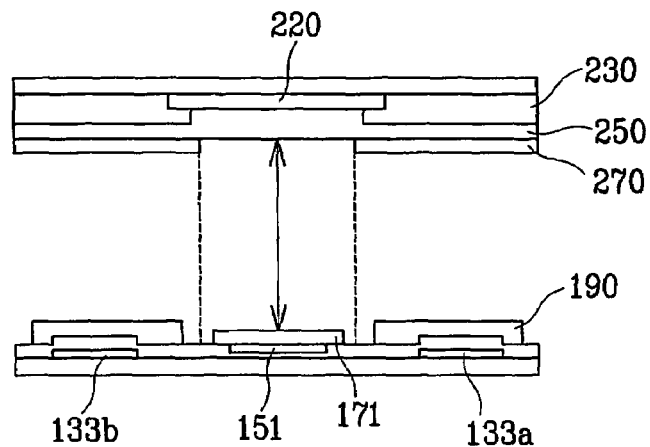
FIG. 11 is a sectional view schematically showing the overlapping between a cutout of a reference electrode and a data line.
Figure 12:
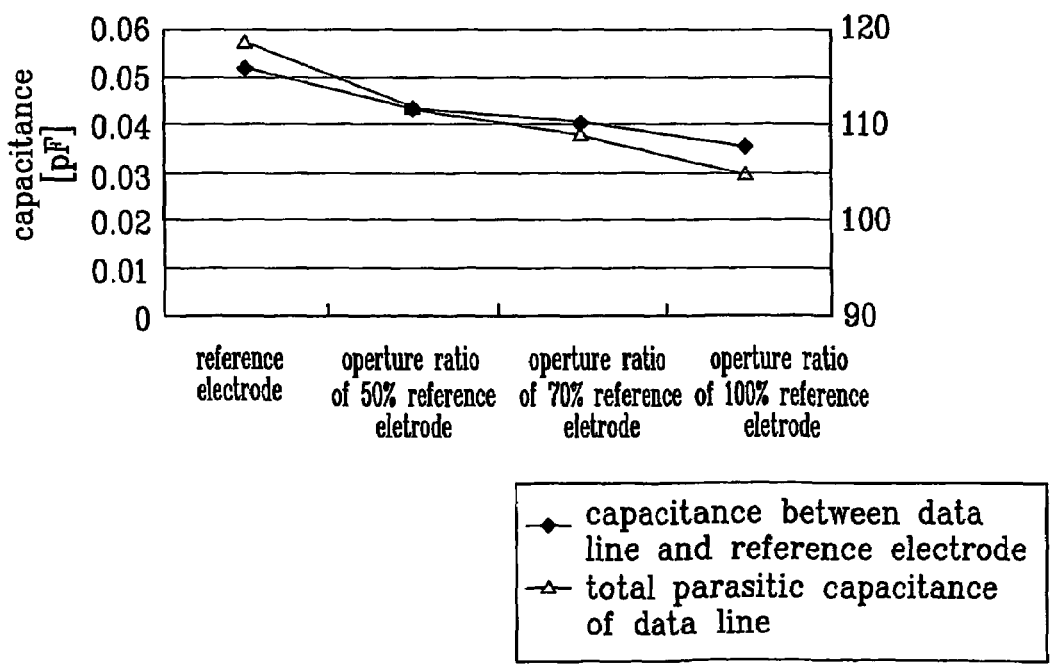
FIG. 12 is a graph showing the parasitic capacitance applied to a data line as function of the ratio of removed area in a portion of a reference electrode overlapping the data line.

FIG. 11 is a sectional view showing the overlapping of cutout of a reference electrode and a data line, and FIG. 12 is a graph showing the parasitic capacitance applied to a data line as function of the ratio of removed area in a portion of a reference electrode overlapping the data line.

As shown in FIG. 11, a cutout 171 of a reference electrode 270 overlaps a data line 171. The removed portion of the reference electrode 270 corresponding to the cutout 171 is the nearest portion of the reference electrode 270 from the data line 171. Since all portions of the reference electrode 270 forms a capacitor in cooperation with the data line 171 and the nearest portion of the reference electrode 270 is removed, the capacitance therebetween, which causes a negative effect that the image signal flowing along the data line 171 is distorted due to RC delay, is reduced. Accordingly, the overlapping of the cutout of the reference electrode 270 and the data line 171 reduces the distortion of the image signal.

FIG. 12 shows the magnitude of the capacitance between a data line 171 and a reference electrode 270 as function of removed area in the reference electrode 270 on the data line 171. Removal of the entire area of the overlapping portion of the reference electrode 270 overlapping the data line 171 reduces the capacitance therebetween about 10% relative to the capacitance when entire area of the overlapping portion is remained, while about 50% removal reduces the capacitance about 5%. Since the second embodiment of the present invention removes about 50% of the overlapping portion of the reference electrode 270, the parasitic capacitance is reduced by about 5%. The reduction of the parasitic capacitance decreases the delay of the image signals transmitted along the data lines. Table 1 shows the measured results for a practical panel using an oscilloscope.

TABLE 1

|  |  | No Removal of Reference Electrode | 50% Removal of Reference Electrode |
|---|---|---|---|
| Resistance (kΩ) |  | 44.9 | 46 |
| Delay (μs) | 60 grays | 5.724 | 5.513 |
|  | 256 grays | 6.443 | 6.123 |

Now, methods of manufacturing a TFT array panel for an LCD according to embodiments of the present invention, which provides above-described structure and effect, will be described.

First, referring to FIGS. 13 to 17, a method using five photo-masks will be described.

Figure 13:
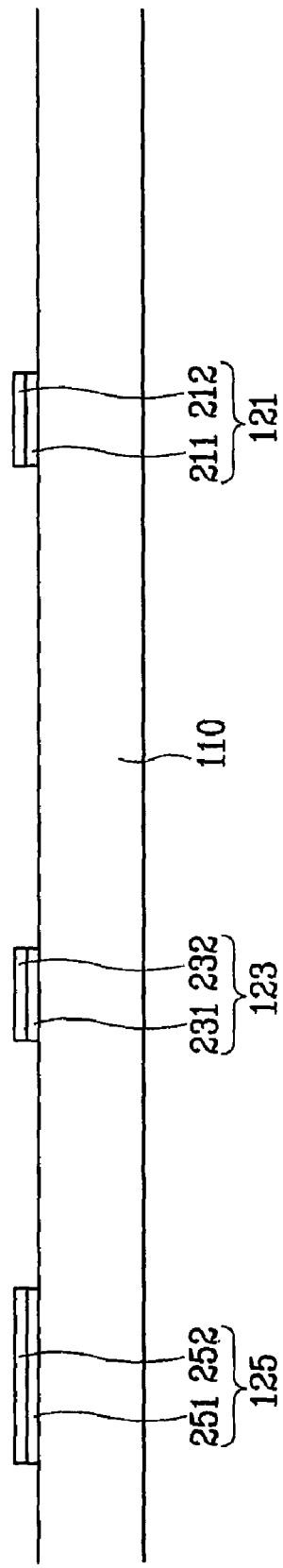
FIGS. 13 to 17 are sectional views of a TFT array panel for an LCD sequentially showing the steps of a manufacturing method thereof using five masks.

As shown in FIG. 13, a first gate wire layer 211, 231 and 251 preferably made of Cr or Mo alloy having excellent physical and chemical characteristics and a second gate wire layer 212, 232 and 252 preferably made of Al or Ag alloy having a low resistivity are deposited on a substrate 110 and patterned to form a gate wire including a plurality of gate lines 121, a plurality of gate electrodes 123 and a plurality of gate pads 125 and extending substantially in the transverse direction. At this time, although not shown, a storage electrode wire is also formed (A First Mask).

For the first gate wire layer 211, 231 and 251 of Mo alloy and the second gate wire layer 212, 232 and 252 of Ag alloy, both layers are etched by an etchant for Al alloy such as a mixture of phosphoric acid, nitric acid, acetic add and deionized water. Thus, the formation of the gate wire 121, 123 and 125 including double layers is completed by using a single etching process. Since the etching ratio of the mixture of phosphoric acid, nitric add, acetic add and deionized water for Ag alloy is higher than that for Mo alloy, a taper angle of 30 degrees required for the gate wire can be obtained.

Figure 14:
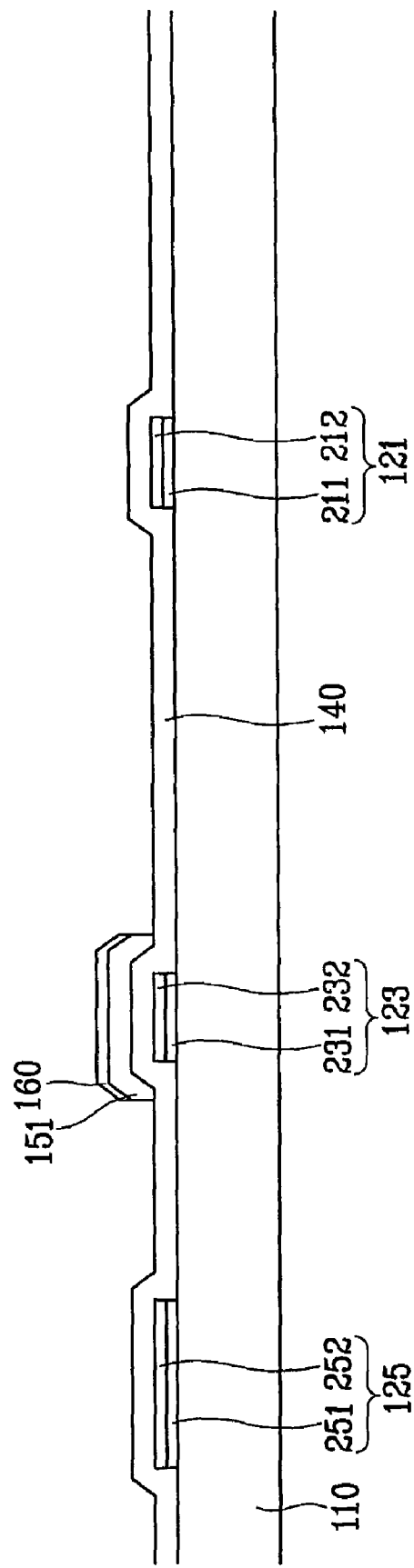

Next, as shown in FIG. 14, three layers, a gate insulating layer 140 preferably made of SiNx, an amorphous silicon layer and a doped amorphous silicon layer are deposited sequentially, and the amorphous silicon layer and the doped amorphous silicon layer are photo-etched together to form a semiconductor layer 151 and an ohmic contact layer 160 on the gate insulating layer 140 opposite the gate electrodes 123 (A Second Mask).

Figure 15:
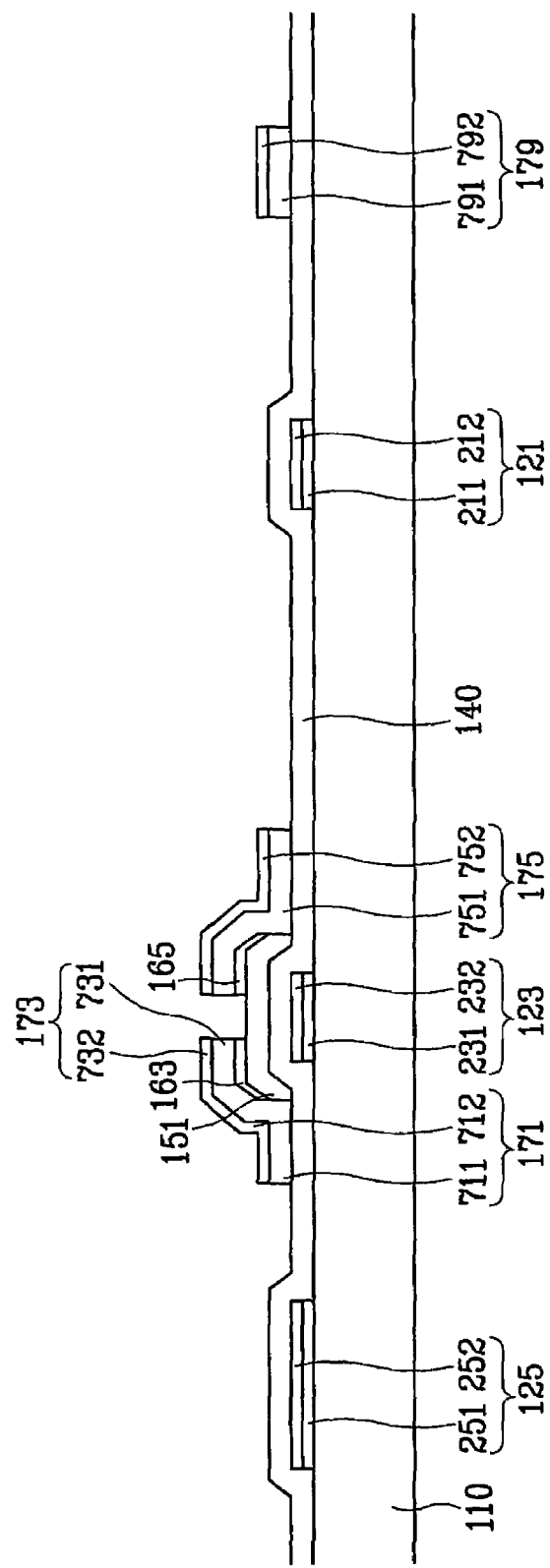

Subsequently, as shown in FIG. 15, a first data wire layer 711, 731, 751 and 791 preferably made of Cr or Mo alloy and a second data wire layer 712, 732, 752 and 792 preferably made of Al or Ag alloy are deposited and photo-etched to form a data wire. The data wire include a plurality of data lines 171 intersecting the gate line 121, a plurality of source electrodes 173 connected to the data lines 171 and extending onto the gate electrodes 121, a plurality of data pads 179 connected to one ends of the data lines 171 and a plurality of drain electrodes 175 separated from the source electrodes 173 and opposite the source electrodes 173 with respect to the gate electrodes 121 (A Third Mask).

Thereafter, portions of the doped amorphous silicon layer pattern 160, which are not covered by the data wire 171, 173, 175 and 179, are etched such that the doped amorphous silicon layer pattern 160 is separated into two portions 163 and 165 opposite each other with respect to the gate electrodes 123 to expose portions of the semiconductor pattern 151 between the two portions of the doped amorphous silicon layer 163 and 165. Oxygen plasma treatment is preferably performed in order to stabilize the exposed surfaces of the semiconductor layer 151.

Figure 16:
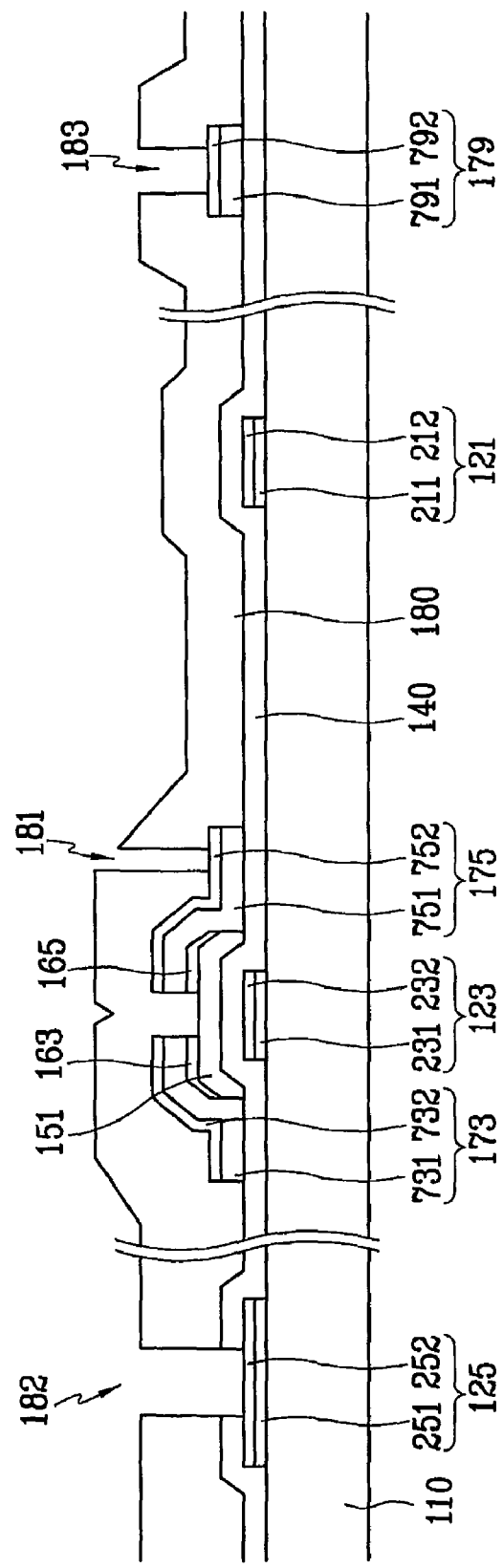

Next, as shown in FIG. 16, a passivation layer 180 is formed by growing a a-Si:C:O film or a a-Si:O:F film by chemical vapor deposition ("CVD"), by depositing an inorganic insulating film such as SiNx, or by coating an organic insulating film such as acryl-based material. The deposition of the a-Si:C:O film is performed by using $SiH(CH_3)_3$, $SiO_2(CH_3)_4$, $(SiH)_4O_4(CH_3)_4$, $Si(C_2H_5O)_4$ etc., in gaseous states as a basic source, and flowing a gas mixture of an oxidizer such as $N_2O$ and $O_2$ and Ar or He. The deposition of the a-Si:O:F film is performed in the flow of a gas mixture of $O_2$ and $SiH_4$, $SiF_4$, etc. $CF_4$ may be added as an auxiliary source of fluorine. (A Second Mask)

The passivation layer 180 is patterned together with the gate insulating layer 140 by a photo etching process to form a plurality of contact holes 181, 182 and 183 exposing the gate pads 125, the drain electrodes 175 and the data pads 179. Here, the planar shapes of the contact holes 181, 182 and 183 are polygonal or circular. It is preferable that the area of each of the contact holes 181 and 183 exposing the pads 125 and 179 is equal to or larger than 0.5 mm×15 μm and equal to or less than 2 mm×60 μm. Although not shown, a plurality of contact holes for contacting storage bridges with the storage electrode lines and the storage electrodes are also formed in this step (A Fourth Mask).

Figure 17:
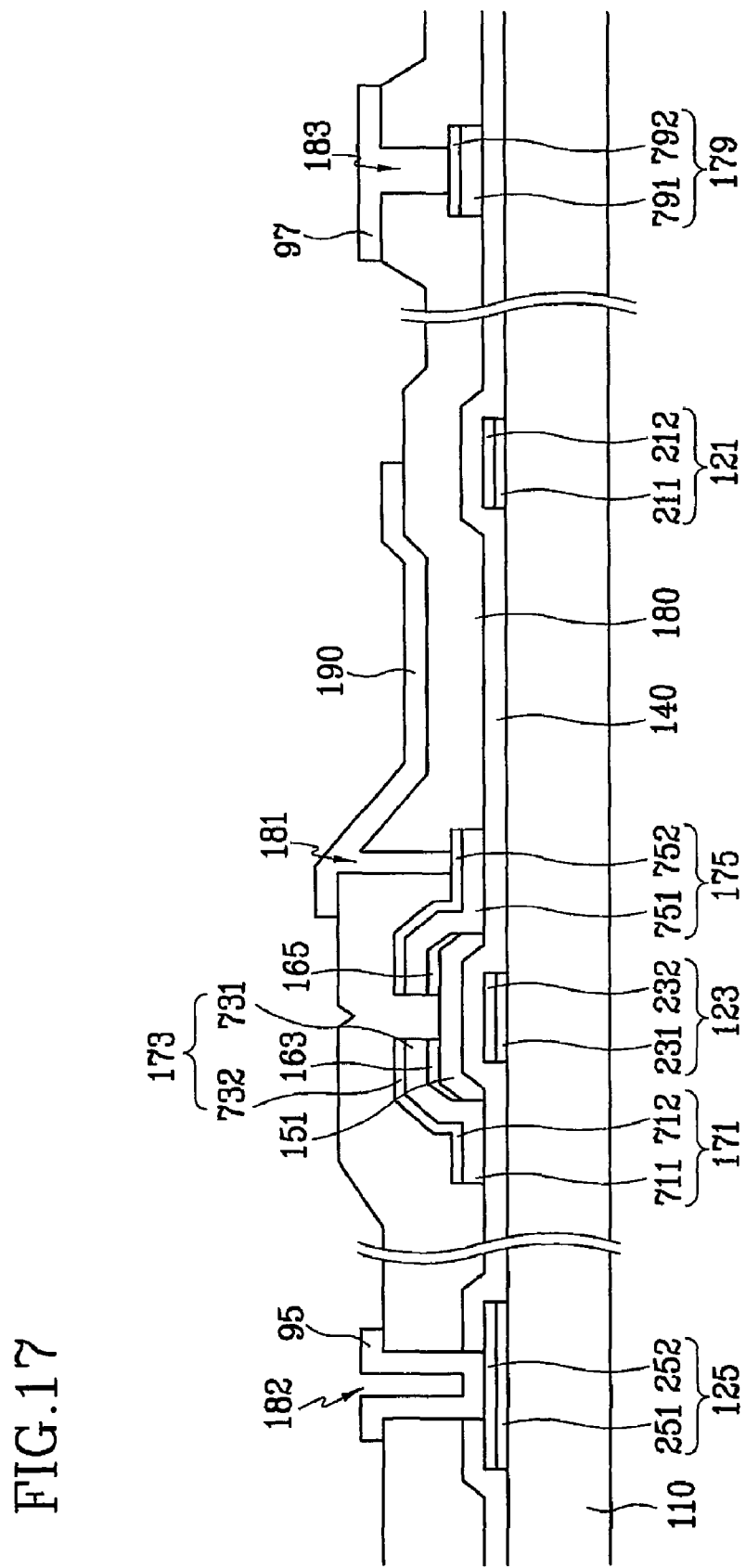

Finally, as shown in FIG. 17, an ITO layer or an IZO layer is deposited and photo-etched to a plurality of pixel electrodes 190, a plurality of auxiliary gate pads 95 and a plurality of auxiliary data pads 97. Each pixel electrode 190 is connected to the drain electrode 175 via the first contact hole 181, and each of the auxiliary gate pad 95 and the auxiliary data pad 97 are connected to the gate pad 95 and the data pad 97 via the second and the third contact holes 182 and 183. A pre-heating process using nitrogen gas is preferably performed before depositing ITO or IZO. This is required for preventing the formation of metal oxides on the exposed portions of the metal layers through the contact holes 181, 182 and 183. Although not shown, a plurality of storage bridges is also formed in this step, and a photo-mask is designed such that the cutouts of the pixel electrodes 190 have an inversion symmetry with respect to the data lines 171 (A Fifth Mask).

Now, a method of manufacturing a TFT array panel using four photo-masks according to an embodiment of the present invention will be described.

FIGS. 18A and 18B to FIGS. 26A and 26B are sectional views of a TFT array panel for an LCD sequentially showing the steps of a manufacturing method thereof using four masks.

Figure 18B:
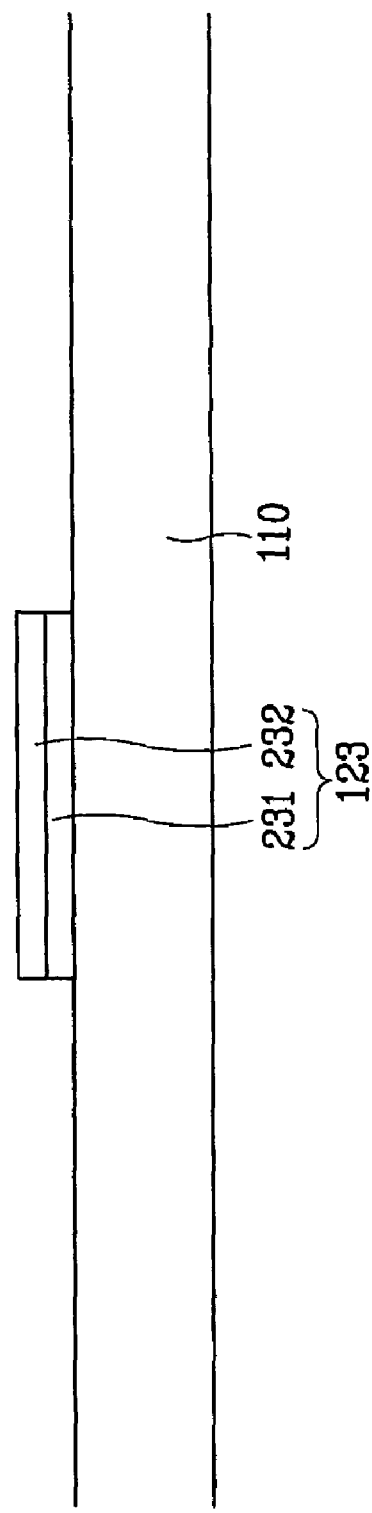

First, as shown in FIGS. 18A and 18B, like the first embodiment, a first gate wire layer 211, 231 and 251 preferably made of Cr or Mo alloy having excellent physical and chemical characteristics and a second gate wire layer 212, 232 and 252 preferably made of Al or Ag alloy having a low resistivity are deposited on a substrate 110 and patterned to form a gate wire including a plurality of gate lines 121, a plurality of gate electrodes 123 and a plurality of gate pads 125 and a storage electrode wire (A First Mask).

Figure 19A:
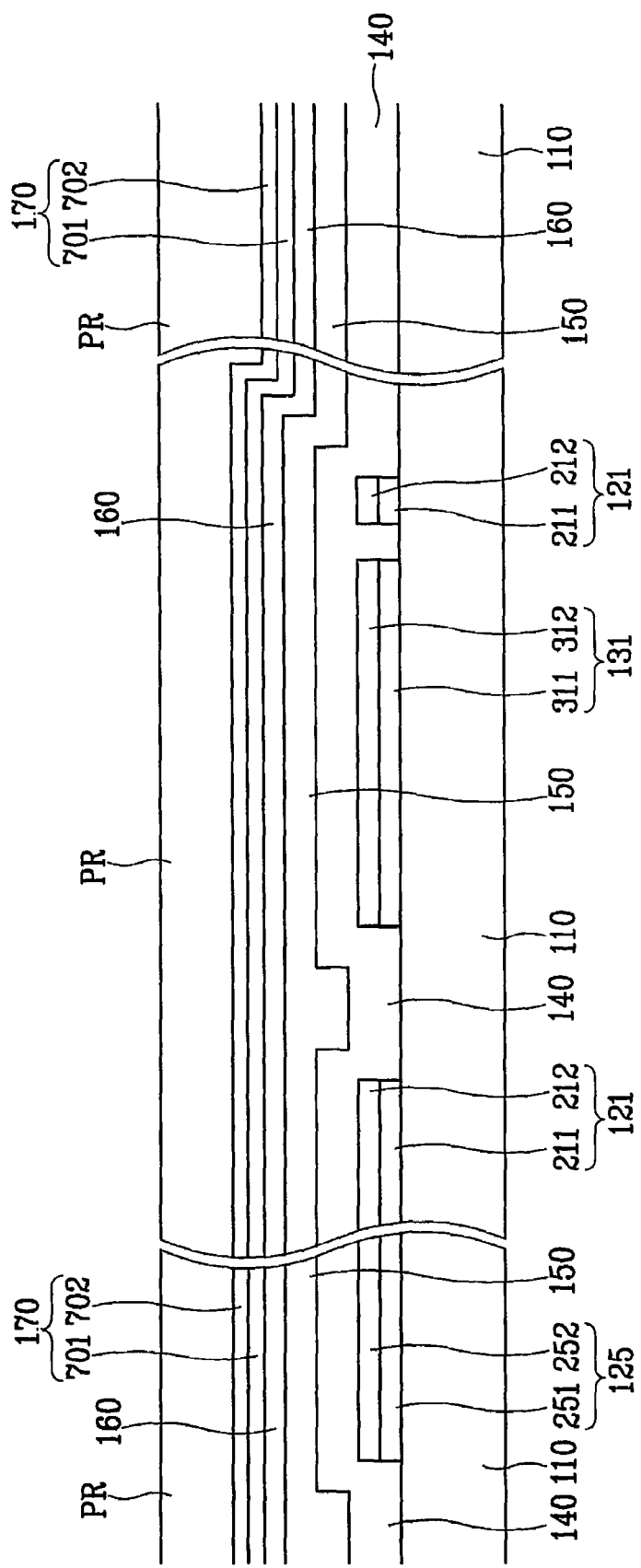

Next, as shown in FIGS. 19A and 19B, a gate insulating layer 140 of SiNx, a semiconductor layer 150, and a contact layer 160 are sequentially deposited by CVD such that the layers 30, 40 and 50 bear thickness of 1,500-5,000 Å, 500-2,000 Å and 300-600 Å, respectively. A first conductive film 701 preferably made of Cr or Mo alloy and a second conductive film 702 preferably made of Al or Ag alloy are deposited by sputtering to form a conductive layer 170. Thereafter, a photoresist film PR with the thickness of 1-2 μm is coated thereon.

Figure 20A:
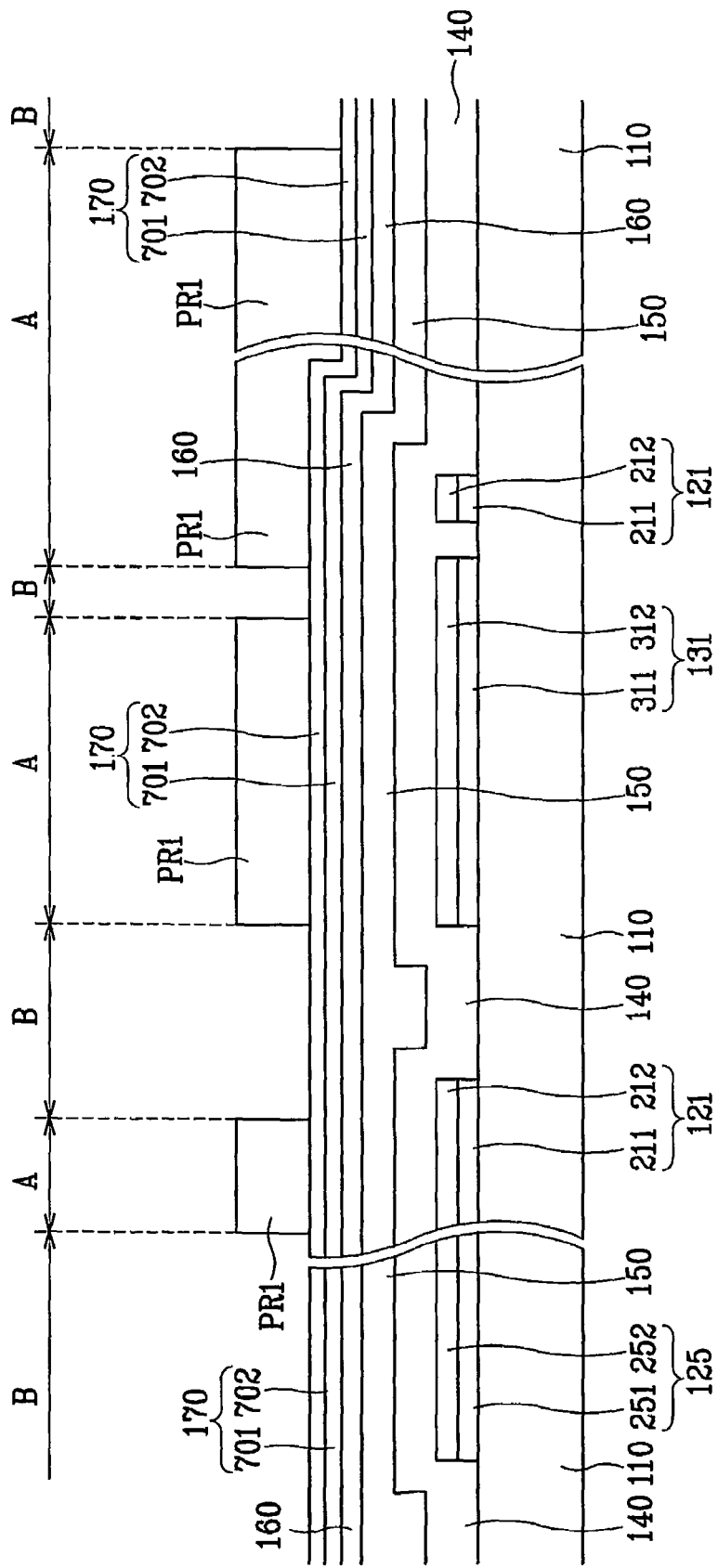

Subsequently, the photoresist film PR is exposed to light through a mask, and developed to form a photoresist pattern PR2 and PR1 as shown in FIGS. 20A and 20B. Second portions PR2 of the photoresist pattern PR2 and PR1, which are located on channel areas C of TFTs between source and drain electrodes 173 and 175, are established to bear thickness smaller than that of the first portions PR1 on data areas A where the data wire is formed. The portions of the photoresist film on the remaining area B are removed. The thickness ratio of the second portions PR2 on the channel areas C to the first portions PR1 on the data areas A is adjusted depending upon the etching conditions in the etching steps to be described later. It is preferable that the thickness of the second portions PR2 is equal to or less than half of the thickness of the first portions PR1, in particular, equal to or less than 4,000 Å.

The position-dependent thickness of the photoresist film is obtained by several techniques. In order to adjust the amount of light exposure in the areas C, a slit pattern, a lattice pattern or translucent films are provided on a mask.

When using a slit pattern, it is preferable that the width of the portions between the slits or the distance between the portions, i.e., the width of the slits is smaller than the resolution of an exposer used for the photolithography. In case of using translucent films, thin films with different transmittances or with different thicknesses may be used to adjust the transmittance of the mask.

When the photoresistive film is irradiated with light through such a mask, polymers of the portions directly exposed to the light are almost completely decomposed, and those of the portions facing the slit pattern or the translucent films are not completely decomposed due to the small amount of light exposure. The polymers of the portions blocked by light-blocking films are hardly decomposed. Development of the photoresistive film makes the portions having the polymers, which are not decomposed, to be left, and makes the portions exposed to the smaller light irradiation to be thinner than the portions which do not experience the light exposure. Here, it is required not to make the exposure time long enough to decompose all the molecules.

The thin portions PR2 of the photoresist pattern may be obtained by performing a reflow process to flow a reflowable photoresist film into the areas without the photoresist film after exposing to light and developing the photoresist film, using a usual mask with transmissive areas completely transmitting the light and blocking areas completely blocking the light.

Thereafter, the photoresist pattern PR2 and the underlying layers, i.e., the conductive layer 170, the contact layer 150 and the semiconductor layer 150 are etched such that a data wire and the underlying layers are left over on the data areas A, only the semiconductor layer is left over on the channel areas C, and all of the three layers 170, 160 and 150 are removed from the remaining areas B to expose the gate insulating layer 140.

Figure 21A:
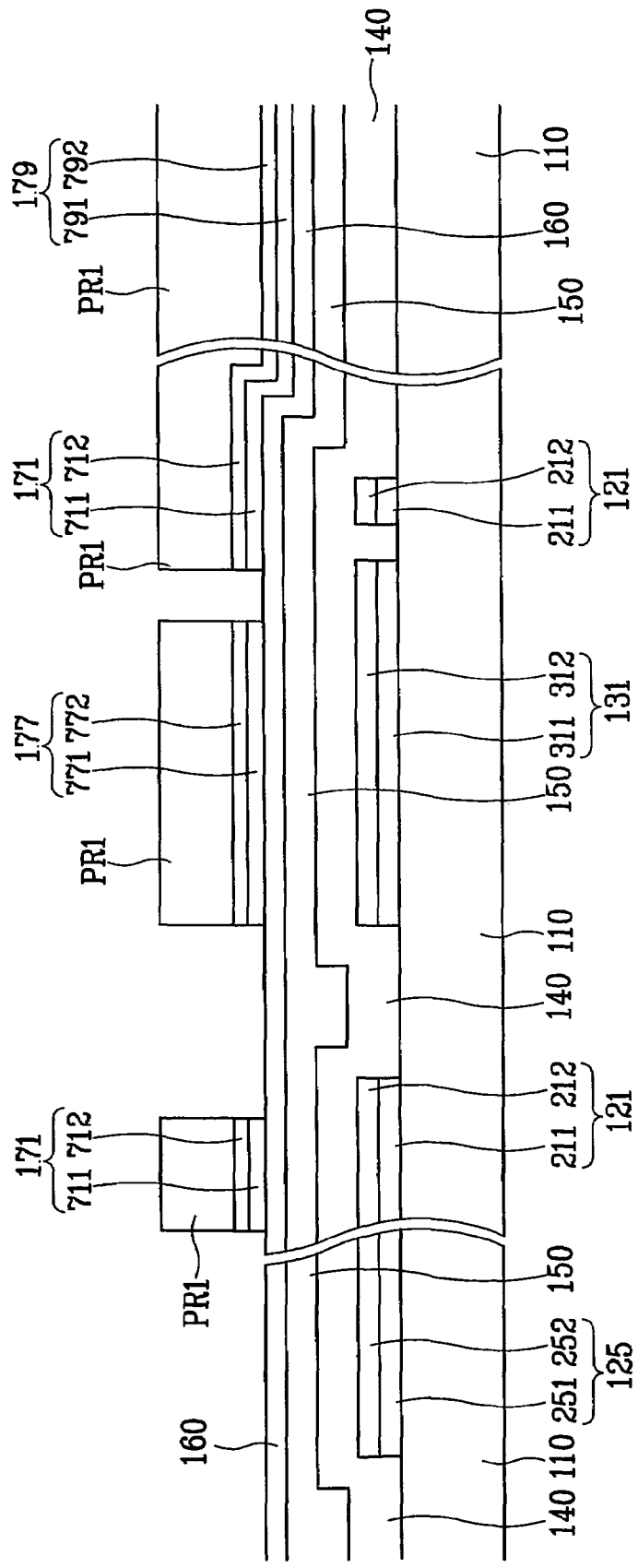

As shown in FIGS. 21A and 21B, the exposed portions of the conductive layer 170 on the areas B are removed to expose the underlying portions of the contact layer 150. In this step, both dry etching and wet etching is selectively used and preferably performed under the condition that the conductive layer 170 is selectively etched while the photoresist pattern PR1 and PR2 is hardly etched. However, an etching condition capable of etching the photoresist pattern PR1 and PR2 as well as the conductive layer 170 would be suitable for dry etching since it is difficult to find a condition for selectively etching only the conductive layer 170 while not etching the photoresist pattern PR1 and PR2. In this case, the second portion PR2 should have relatively thick compared with that for wet etching in order to prevent the exposure of the underlying conductive layer 170 through the etching.

Consequently, as shown in FIGS. 21A and 21B, portions 171, 173, 175 and 179 of the conductive layer on the channel areas C and the data areas A, and a storage capacitor electrodes 177 are left over, while portions of the conductive layer 170 on the remaining areas B is removed out to expose the underlying portions of the contact layer 150. The remaining conductor patterns 171, 173, 175 and 179 have substantially the same shapes as the data wire 171, 173, 175 and 179 except that the source and the drain electrodes 173 and 175 are still connected without separation. When using the dry etching, the photoresist pattern PR1 and PR2 are also etched to a predetermined thickness.

Next, as shown in FIGS. 21A and 21B, the exposed portions of the contact layer 150 on the areas B and the underlying portions of the semiconductor layer 150 are simultaneously removed by dry etching together with the second photoresist portions PR2. The etch is preferably made in a condition that the photoresist pattern PR1 and PR2, the contact layer 150 and the semiconductor layer 150 are simultaneously etched while the gate insulating layer 140 is not etched. (It is noted that the semiconductor layer and the intermediate layer have no etching selectivity.) Particularly, the etching ratios of the photoresist pattern PR1 and PR2 and the semiconductor layer 150 are preferably equal to each other. For example, the film and the layer are etched to substantially the same thickness using a gas mixture of $SF_6$ and HCl or a gas mixture of $SF_6$ and $O_2$. For the equal etching ratios of the photoresist pattern PR1 and PR2 and the semiconductor layer 150, the thickness of the second portions PR2 is preferably equal to or less than the sum of the thicknesses of the semiconductor layer 150 and the contact layer 150.

Figure 22A:
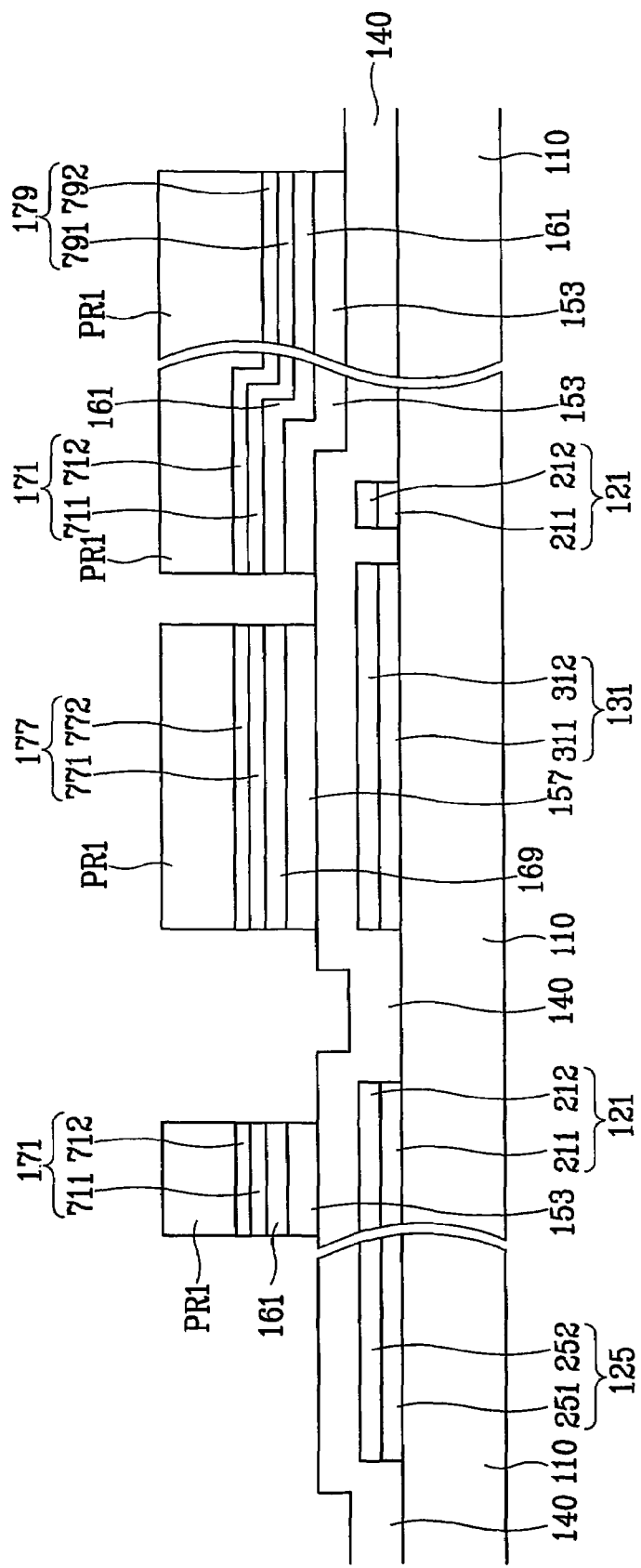

In this way, as shown in FIGS. 22A and 22B, the second portions PR2 on the channel areas C are removed to expose the source/drain conductor pattern 173 and 175, and the portions of the contact layer 150 and the semiconductor layer 150 on the areas B are removed to expose the underlying portions of the gate insulating layer 140. Meanwhile, the first portions PR1 on the data areas A are also etched to have reduced thickness. In this step, the formation of a semiconductor pattern 151, 153 and 157 are completed. A contact layer 161, 163 and 165 and 169 is formed on the semiconductor pattern 151, 153 and 157.

Residual photoresist remained on the surface of the source/drain conductor pattern 173 and 175 on the channel areas C is then removed by ashing.

Figure 23A:
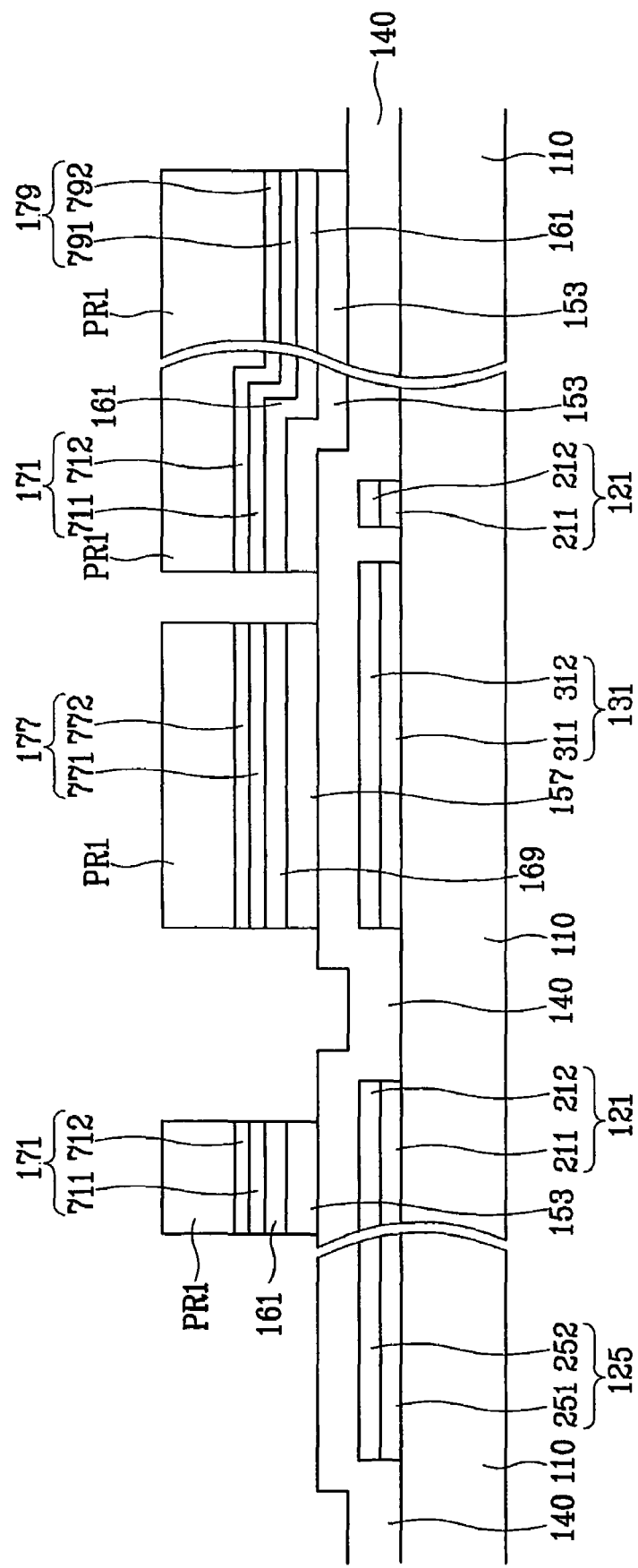
Figure 23B:
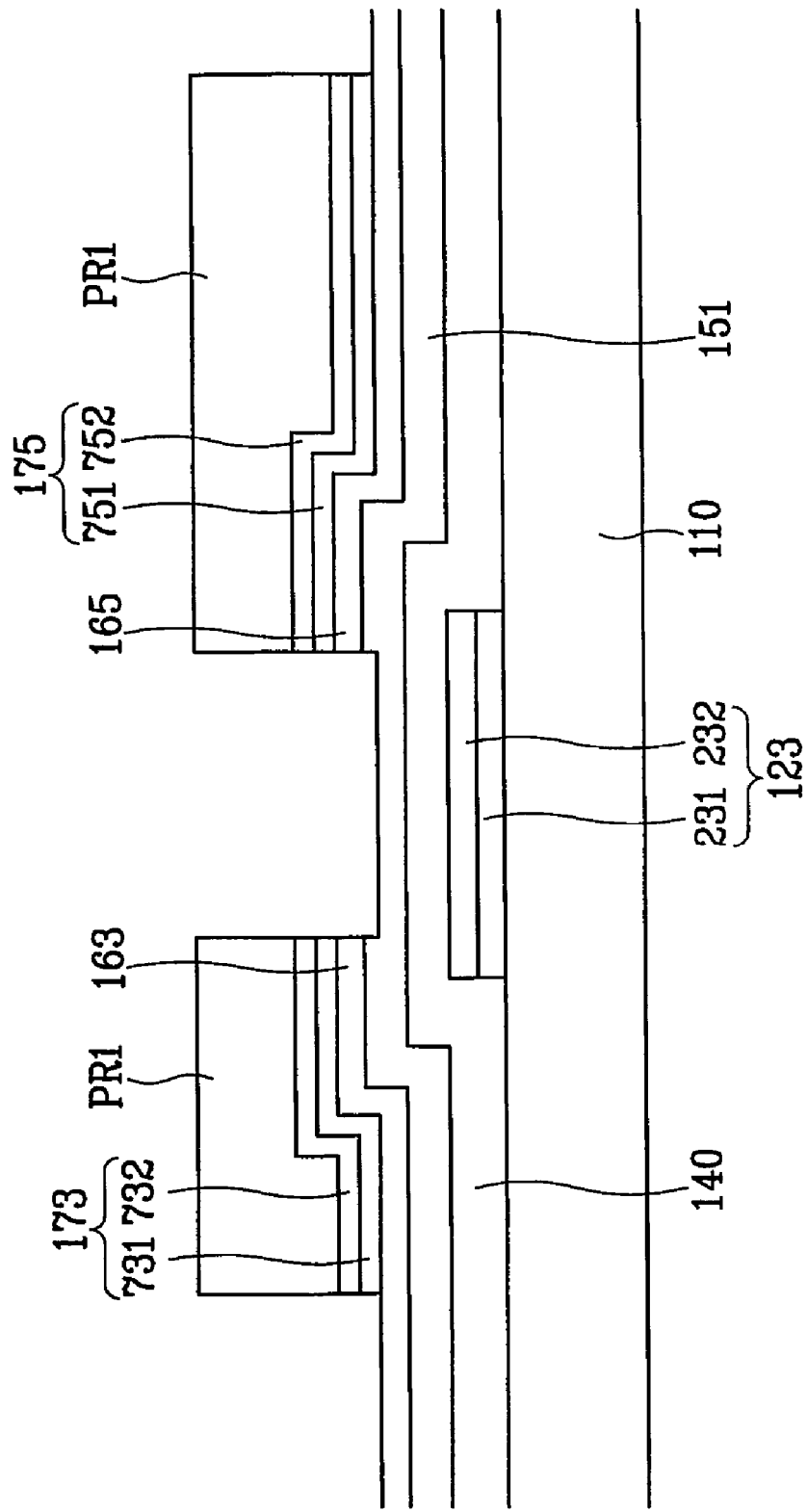

Subsequently, as shown in FIGS. 23A and 23B, the exposed portions of the source/drain conductor pattern 173 and 175 on the channel areas C and the underlying portions of the source/drain contact layer pattern 163 and 165 are etched to be removed. Dry etching may be applied to both of the source/drain conductor pattern 173 and 175 and the source/drain contact layer pattern 163 and 165. Alternatively, wet etching is applied to the source/drain conductor pattern 173 and 175 while dry etching is applied to the source/drain contact layer pattern 163 and 165. In the former case, it is preferable that the conductor pattern 173 and 175 and the contact layer pattern 1631 and 165 are etched under large etching selectivity because, if not large, it is not easy to find the end point of etching and in turn, it is not easy to adjust the thickness of the semiconductor pattern 151 left on the channel areas C. In the latter case alternately performing dry etch and wet etch, the lateral sides of the source/drain conductor pattern 173 and 175 subject to wet etch are etched, while those of the contact layer pattern 163 and 165 subject to dry etch are hardly etched, thereby obtaining the stepwise lateral sides. Examples of etching gases used for etching the conductor pattern 173 and 175 and the contact layer 163 and 165 are a gas mixture of $CF_4$ and HCl and a gas mixture of $CF_4$ and $O_2$. The gas mixture of $CF_4$ and $O_2$ leaves the semiconductor pattern 151 with even thickness. At this time, as shown in FIG. 23B, top portions of the semiconductor pattern 151 may be removed to cause thickness reduction, and the first portions PR1 of the photoresist pattern is etched to a predetermined thickness. The etching is performed under the condition that the gate insulating layer 140 is hardly etched, and it is preferable that the photoresist film is so thick to prevent the first portion PR1 from being etched to expose the underlying data wire 171, 173, 175 and 179 and the underlying storage capacitor electrodes 177.

In this way, the source and the drain electrodes 173 and 175 are separated from each other while completing the formation of the data wire 171, 173, 175 and 179 and the underlying contact layer pattern 161, 163 and 165.

Finally, the first portions PR1 remained on the data areas A are removed. However, the removal of the first portions PR1 may be made between the removal of the portions of the source/drain conductor pattern 173 and 175 on the channel areas C and the removal of the underlying portions of the contact layer pattern 163 and 165.

As described above, dry etch and wet etch are alternately performed or only dry etch is used. Although the latter process using only one type of etch is relatively simple, it is hard to find appropriate etching conditions. On the contrary, the former process enables to find proper etching conditions while it is rather complicated.

Figure 24A:
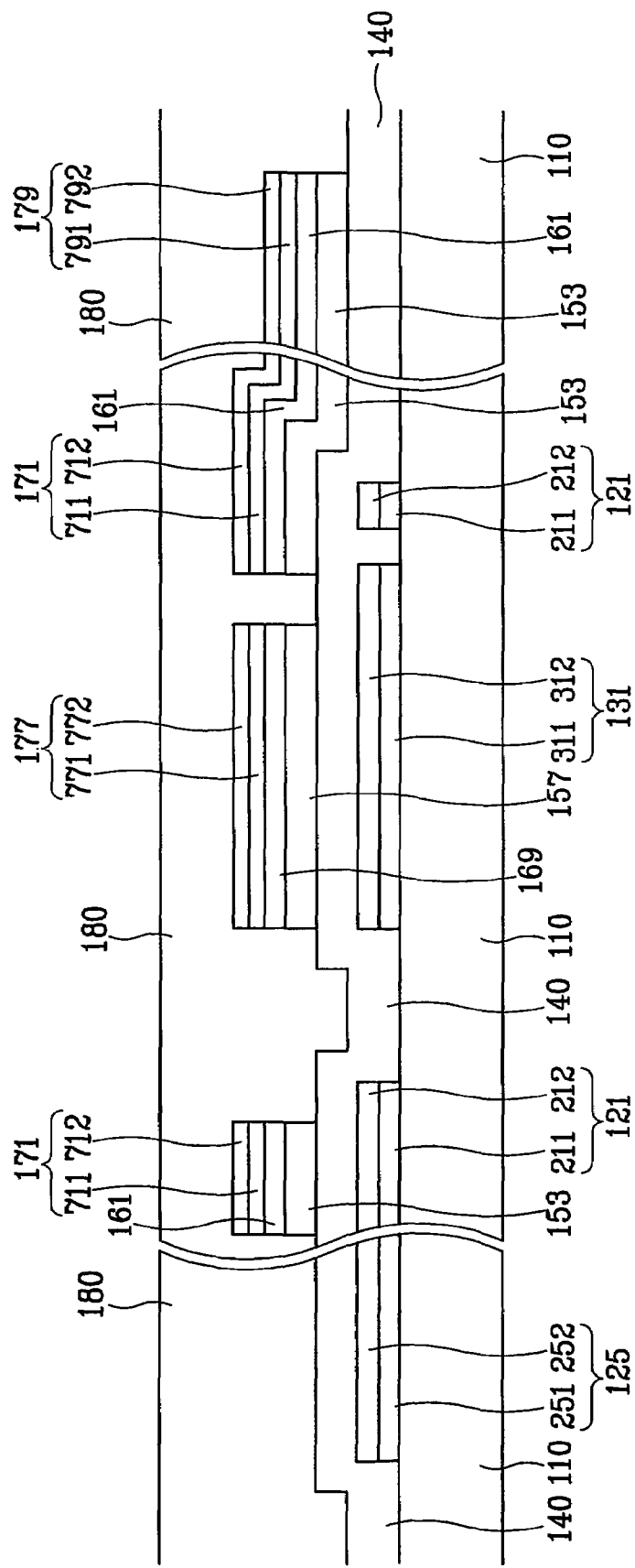
Figure 24B:
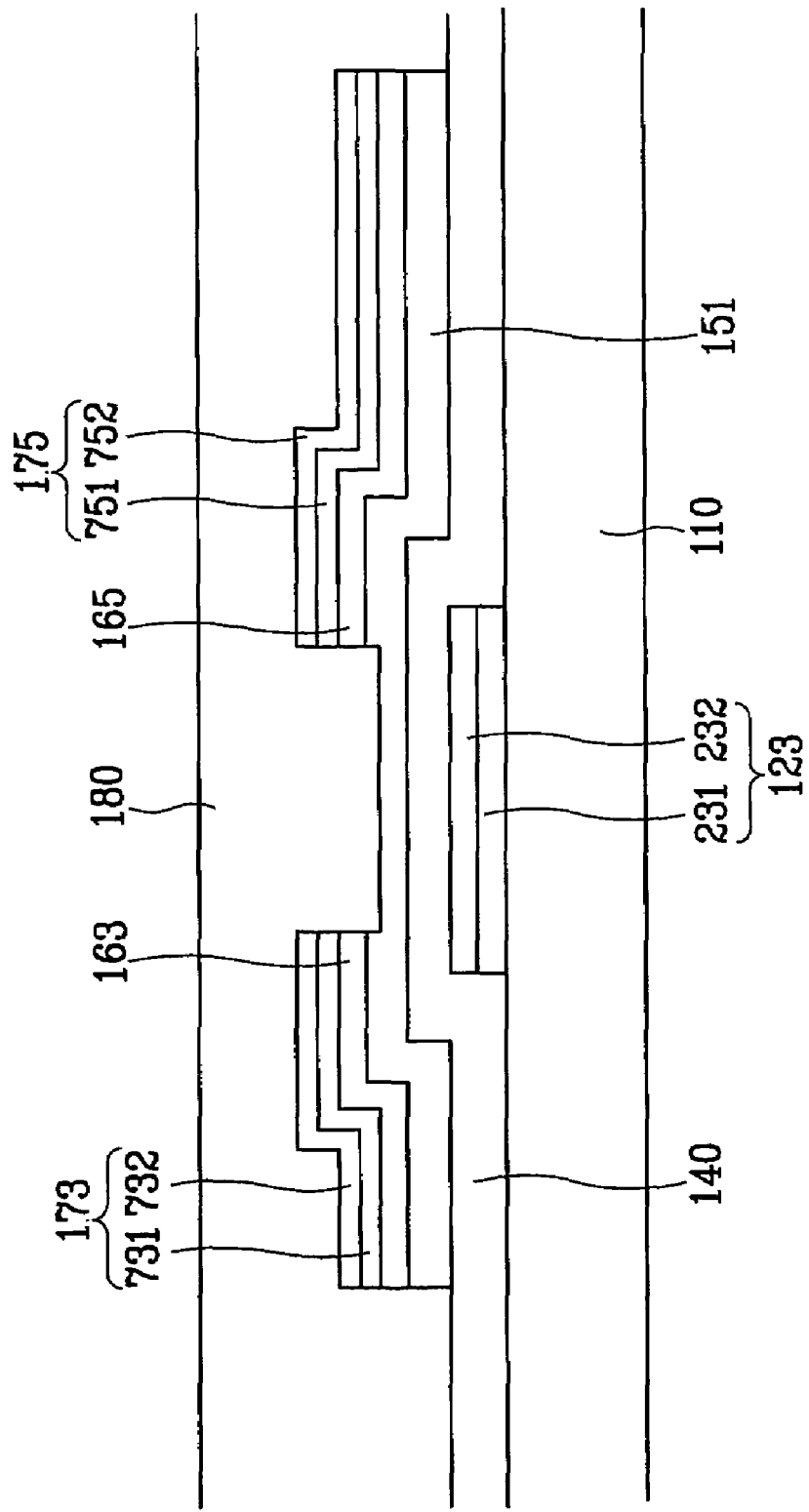

Next, as shown in FIGS. 24A and 24B, a passivation layer 180 is formed by growing a a-Si:C:O film or a a-Si:O:F film by chemical vapor deposition ("CVD"), by depositing an inorganic insulating film such as SiNx, or by coating an organic insulating film such as acryl-based material. The deposition of the a-Si:C:O film is performed by using SiH$(CH_3)_3$, $SiO_2(CH_3)_4$, $(Si)_4O_4(CH_3)_4$, $Si(C_2H_5O)_4$, etc., in gaseous states as a basic source, and flowing a gas mixture of an oxidizer such as $N_2O$ and $O_2$ and Ar or He. The deposition of the a-Si:O:F film is performed in the flow of a gas mixture of $O_2$ and $SiH_4$, $SiF_4$, etc. $CF_4$ may be added as an auxiliary source of fluorine. (A Second Mask).

Figure 25A:
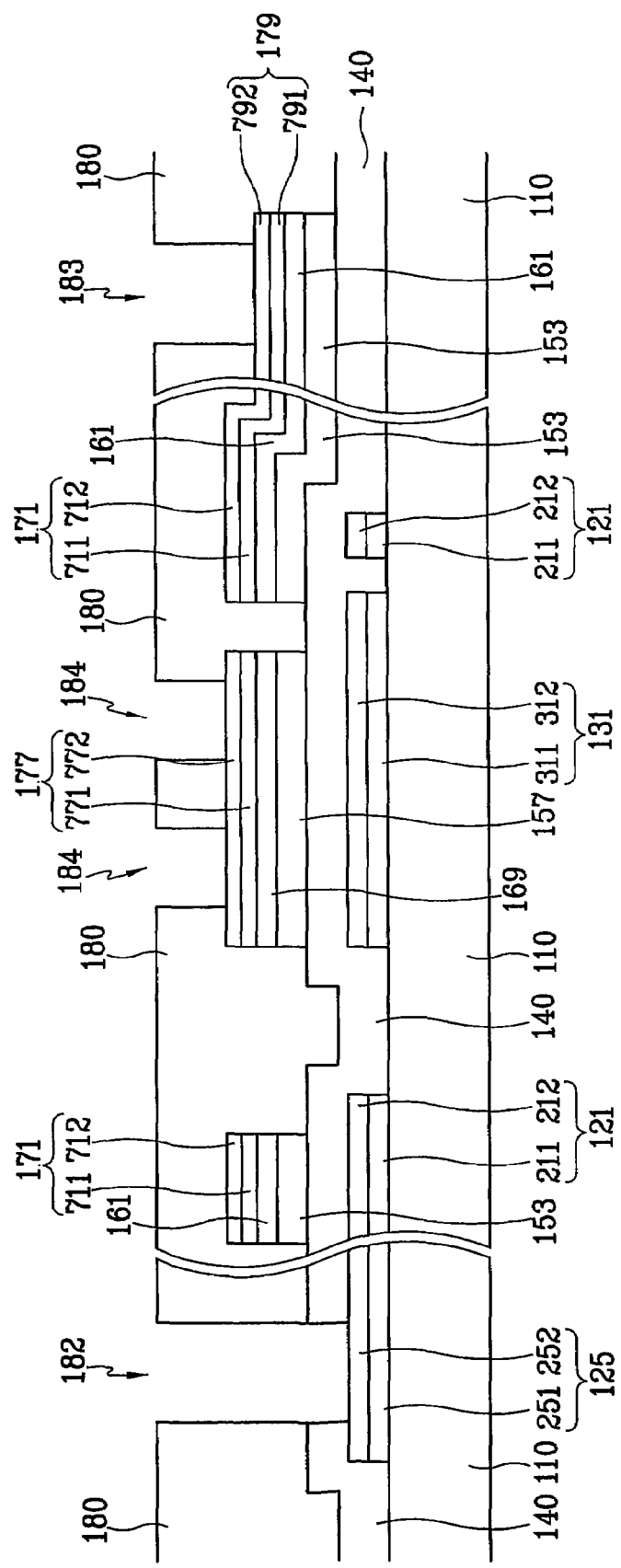

Subsequently, as shown in FIGS. 25A and 25B, the passivation layer 180 is photo-etched together with the gate insulating layer 140 to form a plurality of contact holes 181, 182, 183 and 184 exposing the drain electrodes 175, the gate pads 125 and the data pads 179 and the storage capacitor electrodes 177. It is preferable that the area of each of the contact holes 181 and 183 exposing the pads 125 and 179 is equal to or larger than 0.5 mm×15 μm and equal to or less than 2 mm×60 μm. Although not shown, a plurality of contact holes for contacting storage bridges with the storage electrode lines and the storage electrodes are also formed in this step (A Third Mask).

Figure 26A:
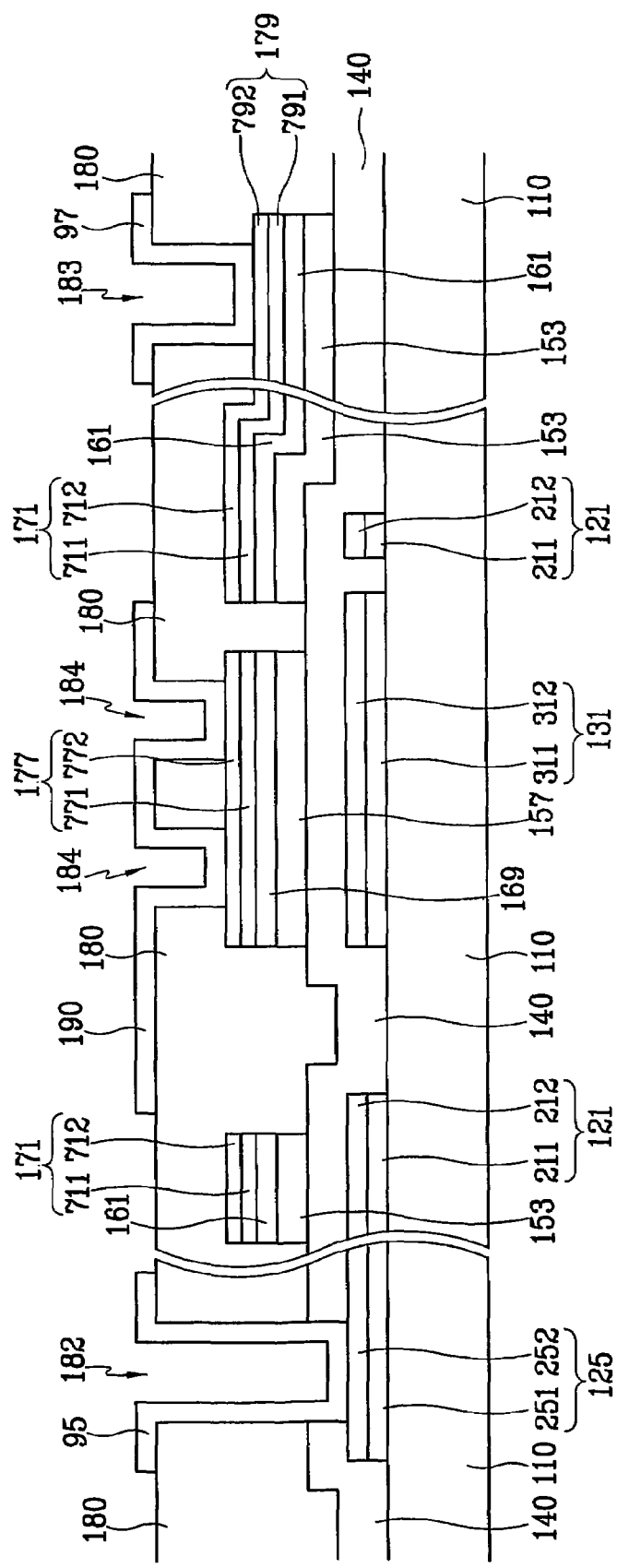
Figure 26B:
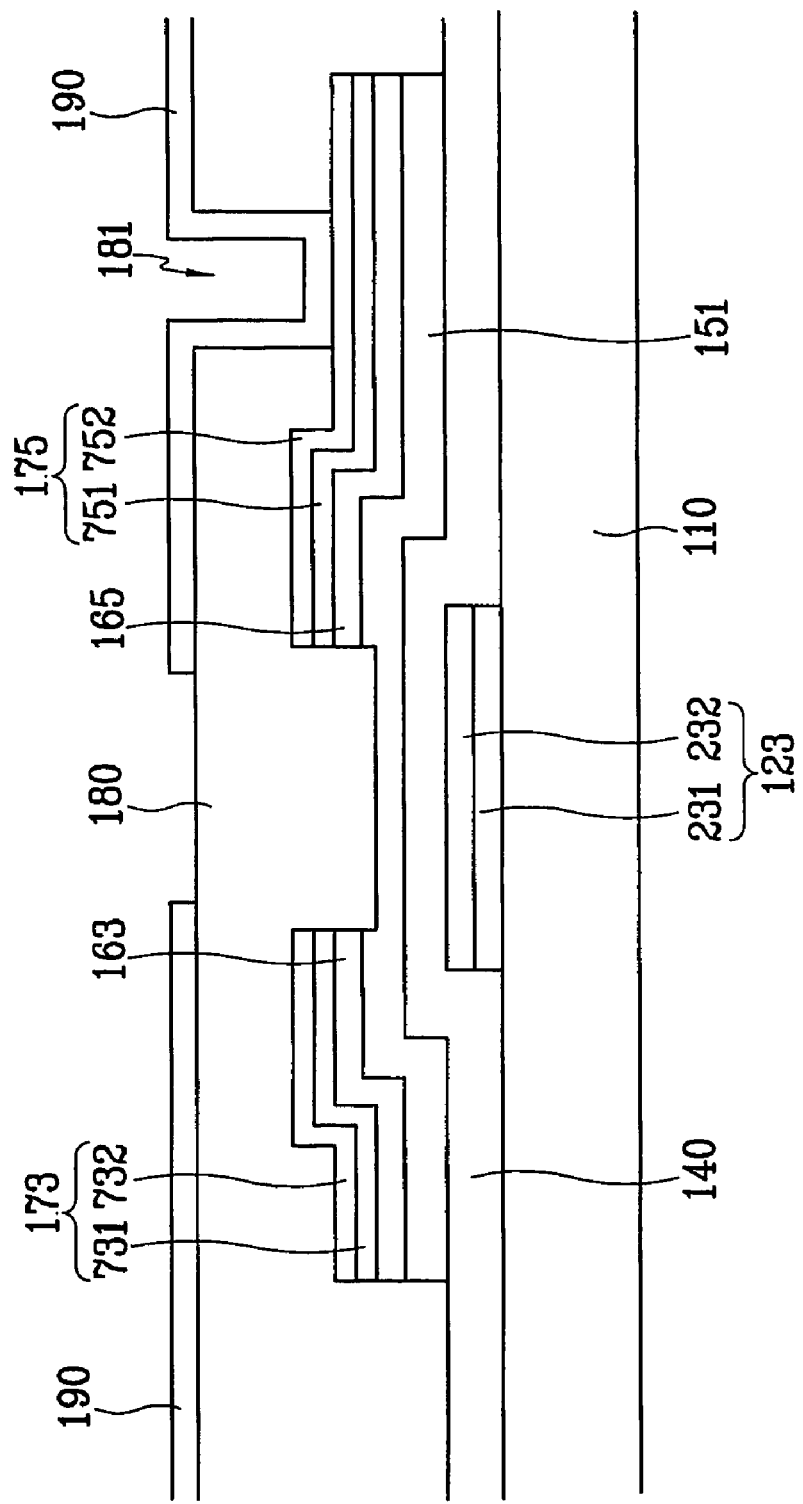

Finally, as shown in FIGS. 26A and 26B, an ITO layer or an IZO layer is deposited and photo-etched to a plurality of pixel electrodes 190, a plurality of auxiliary gate pads 95 and a plurality of auxiliary data pads 97. Each pixel electrode 190 is connected to the drain electrode 175 and the storage capacitor electrode 177, and each of the auxiliary gate pad 95 and the auxiliary data pad 97 are connected to the gate pad 95 and the data pad 97. Although not shown, a plurality of storage bridges is also formed in this step, and a photo-mask is designed such that the cutouts of the pixel electrodes 190 have an inversion symmetry with respect to the data lines 171 (A Fourth Mask).

Since the pixel electrodes 190, the auxiliary gate pads 95 and the auxiliary data pads 97 made of IZO is formed by using a Cr etchant, it is possible to prevent the corrosion of the exposed portions of the data wire or the gate wire through the contact holes during the photo etching step for forming the pixel electrodes 190, the auxiliary gate pads 95 and the auxiliary data pads 97. An example of such etchant is $HNO_3$/$(NH_4)_2Ce(NO_3)_6/H_2O$. Deposition of IZO in a temperature range between a room temperature and about 200° C. is preferred for minimizing the contact resistance at the contacts. It is preferable that a target used for forming an IZO film includes $In_2O_3$ and ZnO and an amount of ZnO contained therein is in a range of 15-29 at %.

A pre-heating process using nitrogen gas is preferably performed before depositing ITO or IZO. This is required for preventing the formation of metal oxides on the exposed portions of the metal layers through the contact holes 181, 182, 183 and 184.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. Especially, a variety of modifications may be made in arrangements of cutouts provided at the pixel electrodes and the reference electrode.

The above-described configurations improve the aperture ratio of the LCD and reduce the distortion of the image signals.

What is claimed is:

1. A thin film transistor array panel for a liquid crystal display comprising:
   an insulating substrate;
   a gate line formed on the insulating substrate;
   a gate insulating layer formed on the gate lines;
   a data line formed on the gate insulating layer;
   a passivation layer formed on the data line;
   a plurality of pixel electrodes formed on the passivation layer and having a plurality of cutouts,
   a plurality of storage electrode wires including a storage electrode line parallel to the gate line and a storage electrode connected to the storage electrode line; and
   a storage bridge connecting two adjacent storage electrode wires opposite each other with respect to the gate line;
   wherein the cutouts of each pixel electrode comprise a transverse cutout extending substantially along a transverse center line of the pixel electrode; and
   wherein the cutouts of two adjacent pixel electrodes opposite each other with respect to the data line have a diamond-shaped inversion symmetry in a top view of the thin film transistor array panel.

2. The thin film transistor array panel of claim 1, wherein the cutouts of each pixel electrode further comprise at least first and second oblique cutouts extending in oblique directions, and
   wherein the cutouts of each pixel electrode comprise a transverse cutout extending substantially in a transverse direction to partition the pixel electrode into upper and lower halves and the at least first and second oblique cutouts extending in oblique directions and are located respectively in the upper and the lower halves of the pixel electrode, and the oblique cutouts are substantially perpendicular to each other.

3. A liquid crystal display comprising:
   a first insulating substrate;
   a plurality of first wires formed on the first insulating substrate;
   a plurality of second wires intersecting and insulated from the first wires;
   a plurality of pixel electrodes located on respective pixel areas defined by the first wires and the second wires;
   a plurality of thin film transistors, each having a gate electrode, a source electrode and a drain electrode respectively connected to one of the first wires, one of the second wires and one of the pixel electrodes;
   a second insulating substrate opposite the first insulating substrate;
   a reference electrode formed on the second insulating substrate;
   a plurality of first domain partitioning members formed on one of the first insulating substrate and the second insulating substrate wherein the first domain partitioning members comprise a transverse domain partitioning member extending substantially along a transverse center line of the pixel electrode; and a plurality of second domain partitioning members formed on one of the first insulating substrate or the second insulating substrate, wherein the first and the second domain partitioning members of two adjacent pixel electrodes opposite each other with respect to the data line have a diamond-shaped inversion symmetry in a top view of the liquid crystal display, wherein the first domain partitioning members further comprise at least first and second oblique cutouts extending in oblique directions, and wherein the traverse domain partitioning member of the first domain partitioning members of each pixel electrode comprise a central cutout extending substantially along a transverse center line of the pixel electrode and forking into upper and lower branches diverging obliquely and two oblique cutouts extending in oblique directions and located respectively in a lower half and an upper half of the pixel electrode, and one of the second domain partitioning members of the reference electrode is interposed between the oblique cutouts of the first domain partitioning members and includes an oblique portion parallel to the oblique cutouts and an overlapping portion overlapping edges of at least one of the pixel electrodes and one of the data lines.

4. The liquid crystal display of claim 3, wherein the overlapping portion overlaps the one of the data lines and adjacent two of the pixel electrodes opposite each other with respect to one of the data lines.

5. The liquid crystal display of claim 3, wherein the second domain partitioning members comprises a dielectric protuberance.

6. A liquid crystal display comprising:
a first insulating substrate;
a plurality of first wires formed on the first insulating substrate;
a plurality of second wires intersecting and insulated from the first wires;
a plurality of pixel electrodes located on respective pixel areas defined by the first wires and the second wires;
a plurality of thin film transistors, each having a gate electrode, a source electrode and a drain electrode respectively connected to one of the first wires, one of the second wires and one of the pixel electrodes;
a second insulating substrate opposite the first insulating substrate;
a reference electrode formed on the second insulating substrate;
a plurality of first domain partitioning members formed on one of the first insulating substrate and the second insulating substrate wherein the first domain partitioning members comprise a transverse domain partitioning member extending substantially along a transverse center line of the pixel electrode; and
a plurality of second domain partitioning members formed on one of the first insulating substrate or the second insulating substrate,
wherein the first and the second domain partitioning members of two adjacent pixel electrodes opposite each other with respect to the data line have a diamond-shaped inversion symmetry in a top view of the liquid crystal display,
wherein the first domain partitioning members further comprise at least first and second oblique cutouts extending in oblique directions,
wherein the traverse domain partitioning member is a transverse cutout, and
wherein the first domain partitioning members of the pixel electrodes comprise a plurality of cutouts, the plurality of cutouts of one of the pixel electrodes comprise a transverse cutout extending substantially in a transverse direction to partition the pixel electrode into upper and lower halves, the at least first and second oblique cutouts extending in oblique directions and located in the upper and the lower halves of the pixel electrode, and the oblique cutouts are substantially perpendicular to each other, and wherein the oblique cutouts are interposed between the second domain partitioning members of the reference electrode, and each second domain partitioning member includes an oblique portion parallel to the oblique cutouts and an overlapping portion overlapping edges of the pixel electrodes.

7. The liquid crystal display of claim 6, wherein the second domain partitioning members comprises a dielectric protuberance.

* * * * *